US009892417B2

(12) United States Patent
Shachar et al.

(10) Patent No.: US 9,892,417 B2
(45) Date of Patent: Feb. 13, 2018

(54) SYSTEM AND METHOD FOR APPLYING TRACING TOOLS FOR NETWORK LOCATIONS

(71) Applicant: LIVEPERSON, INC., New York, NY (US)

(72) Inventors: Haggai Shachar, Tel-Aviv (IL); Shahar Nechmad, Tel-Aviv (IL)

(73) Assignee: LivePerson, Inc., New York, NY (US)

( * ) Notice: Subject to any disclaimer, the term of this patent is extended or adjusted under 35 U.S.C. 154(b) by 0 days.

(21) Appl. No.: 15/595,590

(22) Filed: May 15, 2017

(65) Prior Publication Data
US 2017/0372332 A1    Dec. 28, 2017

Related U.S. Application Data

(63) Continuation-in-part of application No. 12/608,117, filed on Oct. 29, 2009, now abandoned.
(Continued)

(51) Int. Cl.
*G06F 15/173* (2006.01)
*G06Q 30/02* (2012.01)
(Continued)

(52) U.S. Cl.
CPC ......... *G06Q 30/0201* (2013.01); *H04L 67/22* (2013.01); *G06F 17/3087* (2013.01)

(58) Field of Classification Search
CPC ............................ G06Q 30/0201; H04L 67/22
(Continued)

(56) References Cited

U.S. PATENT DOCUMENTS 5,450,537 A    9/1995    Hirai et al.
5,517,405 A    5/1996    McAndrew et al.
(Continued)

FOREIGN PATENT DOCUMENTS

EP    840244 A1    5/1998
EP    1233361 A1    8/2002
(Continued)

OTHER PUBLICATIONS

Chartrand Sabra, "A new system seeks to ease the bottleneck in the customer-service information highway," The New York Times (Apr. 30, 2001), 2 pages.
(Continued)

*Primary Examiner* — El Hadji Sall
(74) *Attorney, Agent, or Firm* — Kilpatrick Townsend & Stockton LLP

(57) ABSTRACT

A method is disclosed for enabling a network location to provide an ordering process for data relevant to connected network devices' activities. The method includes assembling the data, utilizing the activity data, and associating the data, such that information is derived to enable a desired expansion of at least one designated activity. Another method is disclosed for managing an object assignment broadcast operations for a network location based on a network device's previous activities. This second method includes tracing a network device's conduct to determine that a network device prefers a particular class of content. The method also includes tagging a network device's profile with the respective observation and deciding by a network location as to the classification factor for a network device to be targeted for an object assignment broadcast.

20 Claims, 19 Drawing Sheets

Related U.S. Application Data

(60) Provisional application No. 61/109,192, filed on Oct. 29, 2008.

(51) Int. Cl.
*H04L 29/08* (2006.01)
*G06F 17/30* (2006.01)

(58) Field of Classification Search
USPC .............................. 709/224, 200, 217, 203
See application file for complete search history.

(56) References Cited

U.S. PATENT DOCUMENTS

| | | | |
|---|---|---|---|
| 5,563,805 A | 10/1996 | Arbuckle et al. |
| 5,572,643 A | 11/1996 | Judson |
| 5,581,702 A | 12/1996 | McArdle et al. |
| 5,583,763 A | 12/1996 | Atcheson et al. |
| 5,590,038 A | 12/1996 | Pitroda |
| 5,592,378 A | 1/1997 | Cameron et al. |
| 5,596,493 A | 1/1997 | Tone |
| 5,611,052 A | 3/1997 | Dykstra et al. |
| 5,636,346 A | 6/1997 | Saxe |
| 5,664,115 A | 9/1997 | Fraser |
| 5,668,953 A | 9/1997 | Sloo |
| 5,678,002 A | 10/1997 | Fawcett et al. |
| 5,694,163 A | 12/1997 | Harrison |
| 5,696,907 A | 12/1997 | Tom |
| 5,699,526 A | 12/1997 | Siefert |
| 5,704,029 A | 12/1997 | Wright |
| 5,710,887 A | 1/1998 | Chelliah et al. |
| 5,715,402 A | 2/1998 | Popolo |
| 5,724,155 A | 3/1998 | Saito |
| 5,724,522 A | 3/1998 | Kagami et al. |
| 5,727,048 A | 3/1998 | Hiroshima et al. |
| 5,727,163 A | 3/1998 | Bezos |
| 5,732,400 A | 3/1998 | Mandler et al. |
| 5,745,654 A | 4/1998 | Titan |
| 5,748,755 A | 5/1998 | Johnson et al. |
| 5,758,328 A | 5/1998 | Giovannoli |
| 5,760,771 A | 6/1998 | Blonder et al. |
| 5,761,640 A | 6/1998 | Kalyanswamy et al. |
| 5,761,649 A | 6/1998 | Hill |
| 5,764,916 A | 6/1998 | Busey et al. |
| 5,765,142 A | 6/1998 | Allred |
| 5,774,869 A | 6/1998 | Toader |
| 5,774,870 A | 6/1998 | Storey |
| 5,774,882 A | 6/1998 | Keen et al. |
| 5,774,883 A | 6/1998 | Andersen et al. |
| 5,778,164 A | 7/1998 | Watkins et al. |
| 5,784,568 A | 7/1998 | Needham |
| 5,793,365 A | 8/1998 | Tang et al. |
| 5,794,207 A | 8/1998 | Walker et al. |
| 5,796,393 A | 8/1998 | MacNaughton et al. |
| 5,796,952 A * | 8/1998 | Davis ............... G06F 11/3419 707/E17.12 |
| 5,797,133 A | 8/1998 | Jones et al. |
| 5,799,151 A | 8/1998 | Hoffer |
| 5,805,159 A | 9/1998 | Bertram et al. |
| 5,806,043 A | 9/1998 | Toader |
| 5,812,769 A | 9/1998 | Graber et al. |
| 5,815,663 A | 9/1998 | Uomini |
| 5,818,907 A | 10/1998 | Mahoney et al. |
| 5,819,029 A | 10/1998 | Edwards et al. |
| 5,819,235 A | 10/1998 | Tamai et al. |
| 5,819,236 A | 10/1998 | Josephson |
| 5,819,291 A | 10/1998 | Haimowitz et al. |
| 5,825,869 A | 10/1998 | Brooks et al. |
| 5,826,241 A | 10/1998 | Stein et al. |
| 5,826,244 A | 10/1998 | Huberman |
| 5,828,839 A | 10/1998 | Moncreiff |
| 5,832,465 A | 11/1998 | Tom |
| 5,835,087 A | 11/1998 | Herz et al. |
| 5,838,682 A | 11/1998 | Dekelbaum et al. |
| 5,838,910 A | 11/1998 | Domenikos et al. |
| 5,839,117 A | 11/1998 | Cameron et al. |
| 5,850,517 A | 12/1998 | Verkler et al. |
| 5,852,809 A | 12/1998 | Abel et al. |
| 5,857,079 A | 1/1999 | Claus et al. |
| 5,859,974 A | 1/1999 | McArdle et al. |
| 5,862,330 A | 1/1999 | Anupam et al. |
| 5,866,889 A | 2/1999 | Weiss et al. |
| 5,870,721 A | 2/1999 | Norris |
| 5,878,403 A | 3/1999 | DeFrancesco et al. |
| 5,895,454 A | 4/1999 | Harrington |
| 5,903,641 A | 5/1999 | Tonisson |
| 5,907,677 A | 5/1999 | Glenn et al. |
| 5,911,135 A | 6/1999 | Atkins |
| 5,916,302 A | 6/1999 | Dunn et al. |
| 5,918,014 A | 6/1999 | Robinson |
| 5,924,082 A | 7/1999 | Silverman et al. |
| 5,930,776 A | 7/1999 | Dykstra et al. |
| 5,940,811 A | 8/1999 | Norris |
| 5,940,812 A | 8/1999 | Tengel et al. |
| 5,943,416 A | 8/1999 | Gisby et al. |
| 5,943,478 A | 8/1999 | Aggarwal et al. |
| 5,945,989 A | 8/1999 | Freishtat et al. |
| 5,948,061 A | 9/1999 | Merriman et al. |
| 5,950,179 A | 9/1999 | Buchanan et al. |
| 5,956,693 A | 9/1999 | Geerlings |
| 5,958,014 A | 9/1999 | Cave |
| 5,960,411 A | 9/1999 | Hartman et al. |
| 5,963,625 A | 10/1999 | Kawecki et al. |
| 5,963,635 A | 10/1999 | Szlam |
| 5,966,699 A | 10/1999 | Zandi |
| 5,970,475 A | 10/1999 | Barnes et al. |
| 5,970,478 A | 10/1999 | Walker et al. |
| 5,974,396 A | 10/1999 | Anderson |
| 5,974,446 A | 10/1999 | Sonnenreich et al. |
| 5,987,434 A | 11/1999 | Libman |
| 5,991,740 A | 11/1999 | Messer |
| 5,995,947 A | 11/1999 | Fraser et al. |
| 6,000,832 A | 12/1999 | Franklin et al. |
| 6,003,013 A | 12/1999 | Boushy |
| 6,009,410 A | 12/1999 | LeMole et al. |
| 6,014,644 A | 1/2000 | Erickson |
| 6,014,645 A | 1/2000 | Cunningham |
| 6,014,647 A | 1/2000 | Nizzari et al. |
| 6,016,504 A | 1/2000 | Arnold et al. |
| 6,026,370 A | 2/2000 | Jermyn |
| 6,028,601 A | 2/2000 | Machiraju et al. |
| 6,029,141 A | 2/2000 | Bezos et al. |
| 6,029,149 A | 2/2000 | Dykstra et al. |
| 6,029,890 A | 2/2000 | Austin et al. |
| 6,044,146 A | 3/2000 | Gisby et al. |
| 6,044,360 A | 3/2000 | Picciallo |
| 6,049,784 A | 4/2000 | Weatherly et al. |
| 6,052,447 A | 4/2000 | Golden |
| 6,052,730 A | 4/2000 | Felciano |
| 6,055,573 A | 4/2000 | Gardenswartz et al. |
| 6,058,375 A | 5/2000 | Park et al. |
| 6,058,428 A | 5/2000 | Wang et al. |
| 6,061,658 A | 5/2000 | Chou et al. |
| 6,064,987 A | 5/2000 | Walker et al. |
| 6,067,525 A | 5/2000 | Jonhson et al. |
| 6,070,149 A | 5/2000 | Tavor et al. |
| 6,073,112 A | 6/2000 | Geerlings |
| 6,076,100 A | 6/2000 | Cottrille et al. |
| 6,078,892 A | 6/2000 | Anderson et al. |
| 6,084,585 A | 7/2000 | Kraft et al. |
| 6,085,126 A | 7/2000 | Mellgren, III et al. |
| 6,085,195 A | 7/2000 | Hoyt et al. |
| 6,088,686 A | 7/2000 | Walker et al. |
| 6,105,007 A | 8/2000 | Norris |
| 6,112,190 A | 8/2000 | Fletcher et al. |
| 6,119,101 A | 9/2000 | Peckover |
| 6,119,103 A | 9/2000 | Basch et al. |
| 6,131,087 A | 10/2000 | Luke et al. |
| 6,131,095 A | 10/2000 | Low et al. |
| 6,134,318 A | 10/2000 | O'Neil |
| 6,134,530 A | 10/2000 | Bunting et al. |
| 6,134,532 A | 10/2000 | Lazarus et al. |
| 6,134,533 A | 10/2000 | Shell |
| 6,134,548 A | 10/2000 | Gottsman et al. |

(56) References Cited

U.S. PATENT DOCUMENTS

| | | |
|---|---|---|
| 6,138,139 A | 10/2000 | Beck et al. |
| 6,141,653 A | 10/2000 | Conklin et al. |
| 6,144,991 A | 11/2000 | England |
| 6,163,607 A | 12/2000 | Bogart et al. |
| 6,167,395 A | 12/2000 | Beck et al. |
| 6,170,011 B1 | 1/2001 | Macleod Beck et al. |
| 6,173,053 B1 | 1/2001 | Bogart et al. |
| 6,182,050 B1 | 1/2001 | Ballard |
| 6,182,124 B1 | 1/2001 | Lau et al. |
| 6,185,543 B1 | 2/2001 | Galperin et al. |
| 6,189,003 B1 | 2/2001 | Leal |
| 6,192,319 B1 | 2/2001 | Simonson |
| 6,192,380 B1 | 2/2001 | Light et al. |
| 6,199,079 B1 | 3/2001 | Gupta et al. |
| 6,202,053 B1 | 3/2001 | Christiansen et al. |
| 6,202,155 B1 | 3/2001 | Tushie et al. |
| 6,208,979 B1 | 3/2001 | Sinclair |
| 6,222,919 B1 | 4/2001 | Hollatz et al. |
| 6,236,975 B1 | 5/2001 | Boe et al. |
| 6,240,396 B1 | 5/2001 | Walker et al. |
| 6,249,795 B1 | 6/2001 | Douglis |
| 6,262,730 B1 | 7/2001 | Horvitz |
| 6,267,292 B1 | 7/2001 | Walker et al. |
| 6,272,506 B1 | 8/2001 | Bell |
| 6,282,284 B1 | 8/2001 | Dezonno et al. |
| 6,285,983 B1 | 9/2001 | Jenkins |
| 6,289,319 B1 | 9/2001 | Lockwood |
| 6,292,786 B1 | 9/2001 | Deaton |
| 6,295,061 B1 | 9/2001 | Park et al. |
| 6,298,348 B1 | 10/2001 | Eldering |
| 6,311,169 B2 | 10/2001 | Duhon |
| 6,311,178 B1 | 10/2001 | Bi et al. |
| 6,324,524 B1 | 11/2001 | Lent et al. |
| 6,327,574 B1 | 12/2001 | Kramer et al. |
| 6,330,546 B1 | 12/2001 | Gopinathan et al. |
| 6,334,110 B1 | 12/2001 | Walter |
| 6,338,066 B1 | 1/2002 | Martin |
| 6,346,952 B1 | 2/2002 | Shtivelman |
| 6,349,290 B1 | 2/2002 | Horowitz et al. |
| 6,356,909 B1 | 3/2002 | Spencer |
| 6,374,230 B1 | 4/2002 | Walker et al. |
| 6,377,936 B1 | 4/2002 | Henrick et al. |
| 6,381,640 B1 | 4/2002 | Beck |
| 6,385,594 B1 | 5/2002 | Lebda et al. |
| 6,393,479 B1 | 5/2002 | Glommen et al. |
| 6,405,181 B2 | 6/2002 | Lent et al. |
| 6,438,526 B1 | 8/2002 | Dykes et al. |
| 6,449,358 B1 | 9/2002 | Anisimov |
| 6,449,646 B1 | 9/2002 | Sikora et al. |
| 6,463,149 B1 | 10/2002 | Jolissaint et al. |
| 6,466,970 B1 | 10/2002 | Lee |
| 6,477,533 B2 | 11/2002 | Schiff et al. |
| 6,507,851 B1 | 1/2003 | Fujiwara et al. |
| 6,510,418 B1 | 1/2003 | Case et al. |
| 6,510,427 B1 | 1/2003 | Bossemeyer, Jr. et al. |
| 6,516,421 B1 | 2/2003 | Peters |
| 6,519,628 B1 | 2/2003 | Locascio |
| 6,526,404 B1 | 2/2003 | Slater |
| 6,535,492 B2 | 3/2003 | Shtivelman |
| 6,542,936 B1 | 4/2003 | Mayle et al. |
| 6,546,372 B2 | 4/2003 | Lauffer |
| 6,549,919 B2 | 4/2003 | Lambert et al. |
| 6,567,791 B2 | 5/2003 | Lent et al. |
| 6,571,236 B1 | 5/2003 | Ruppelt |
| 6,597,377 B1 | 7/2003 | MacPhai |
| 6,606,744 B1 | 8/2003 | Mikurak |
| 6,618,746 B2 | 9/2003 | Desai et al. |
| 6,622,131 B1 | 9/2003 | Brown et al. |
| 6,622,138 B1 | 9/2003 | Bellamkonda |
| 6,654,815 B1 | 11/2003 | Goss |
| 6,662,215 B1 | 12/2003 | Moskowitz et al. |
| 6,665,395 B1 | 12/2003 | Busey et al. |
| 6,671,818 B1 | 12/2003 | Mikurak |
| 6,691,151 B1 | 2/2004 | Cheyer et al. |
| 6,691,159 B1 | 2/2004 | Grewal et al. |
| 6,701,441 B1 | 3/2004 | Balasubramaniam et al. |
| 6,718,313 B1 | 4/2004 | Lent et al. |
| 6,721,713 B1 | 4/2004 | Guheen et al. |
| 6,725,210 B1 | 4/2004 | Key |
| 6,741,995 B1 | 5/2004 | Chen |
| 6,760,429 B1 | 7/2004 | Hung et al. |
| 6,766,302 B2 | 7/2004 | Bath |
| 6,771,766 B1 | 8/2004 | Shaflee et al. |
| 6,795,812 B1 | 9/2004 | Lent et al. |
| 6,804,659 B1 | 10/2004 | Graham et al. |
| 6,826,594 B1 | 11/2004 | Pettersen |
| 6,829,585 B1 | 12/2004 | Grewal et al. |
| 6,836,768 B1 | 12/2004 | Hirsh |
| 6,839,680 B1 | 1/2005 | Liu |
| 6,839,682 B1 | 1/2005 | Blume |
| 6,850,896 B1 | 2/2005 | Kelman et al. |
| 6,865,267 B2 | 3/2005 | Dezono |
| 6,892,226 B1 | 5/2005 | Tso et al. |
| 6,892,347 B1 | 5/2005 | Williams |
| 6,904,408 B1 | 6/2005 | McCarthy et al. |
| 6,920,434 B1 | 7/2005 | Cossette |
| 6,922,705 B1 | 7/2005 | Northrup |
| 6,925,441 B1 | 8/2005 | Jones |
| 6,925,442 B1 | 8/2005 | Shapira et al. |
| 6,950,983 B1 | 9/2005 | Snavely |
| 6,965,868 B1 | 11/2005 | Bednarek |
| 6,981,028 B1 | 12/2005 | Rawat et al. |
| 6,993,557 B1 | 1/2006 | Yen |
| 7,003,476 B1 | 2/2006 | Samra et al. |
| 7,039,599 B2 | 5/2006 | Merriman et al. |
| 7,051,273 B1 | 5/2006 | Holt et al. |
| 7,076,443 B1 | 7/2006 | Emens et al. |
| 7,085,682 B1 | 8/2006 | Heller et al. |
| 7,092,959 B2 | 8/2006 | Chen |
| 7,106,850 B2 | 9/2006 | Campbell et al. |
| 7,123,974 B1 * | 10/2006 | Hamilton ............ G05B 19/4063 700/17 |
| 7,143,063 B2 | 11/2006 | Lent et al. |
| 7,181,492 B2 | 2/2007 | Wen et al. |
| 7,200,614 B2 | 4/2007 | Reid et al. |
| 7,242,760 B2 | 7/2007 | Shires |
| 7,243,109 B2 | 7/2007 | Omega et al. |
| 7,251,648 B2 | 7/2007 | Chaudhuri et al. |
| 7,266,510 B1 | 9/2007 | Cofino |
| 7,287,000 B2 | 10/2007 | Boyd et al. |
| 7,313,575 B2 | 12/2007 | Carr et al. |
| 7,337,127 B1 | 2/2008 | Smith et al. |
| 7,346,576 B2 | 3/2008 | Lent et al. |
| 7,346,604 B1 | 3/2008 | Bharat et al. |
| 7,346,606 B2 | 3/2008 | Bharat |
| 7,370,002 B2 | 5/2008 | Heckerman et al. |
| 7,376,603 B1 | 5/2008 | Mayr et al. |
| 7,403,973 B2 | 7/2008 | Wilsher et al. |
| 7,424,363 B2 | 9/2008 | Cheng |
| 7,523,191 B1 | 4/2009 | Thomas et al. |
| 7,526,439 B2 | 4/2009 | Freishtat et al. |
| 7,536,320 B2 | 5/2009 | McQueen et al. |
| 7,552,080 B1 | 6/2009 | Willard et al. |
| 7,552,365 B1 * | 6/2009 | Marsh ................. G06F 11/0709 707/999.003 |
| 7,562,058 B2 | 7/2009 | Pinto |
| 7,590,550 B2 | 9/2009 | Schoenberg |
| 7,630,986 B1 | 12/2009 | Herz et al. |
| 7,650,381 B2 | 1/2010 | Peters |
| 7,657,465 B2 | 2/2010 | Freishtat et al. |
| 7,660,815 B1 | 2/2010 | Scofield |
| 7,689,924 B1 | 3/2010 | Schneider et al. |
| 7,702,635 B2 | 4/2010 | Horvitz et al. |
| 7,716,322 B2 | 5/2010 | Benedikt et al. |
| 7,730,010 B2 | 6/2010 | Kishore et al. |
| 7,734,503 B2 | 6/2010 | Agarwal et al. |
| 7,734,632 B2 | 6/2010 | Wang |
| 7,739,149 B2 | 6/2010 | Freishtat et al. |
| 7,818,340 B1 | 10/2010 | Warren |
| 7,827,128 B1 | 11/2010 | Karlsson et al. |
| 7,865,457 B2 | 1/2011 | Ravin et al. |
| 7,877,679 B2 | 1/2011 | Ozana |
| 7,958,066 B2 | 6/2011 | Pinckney et al. |
| 7,966,564 B2 | 6/2011 | Catlin et al. |

(56) References Cited

U.S. PATENT DOCUMENTS

| | | |
|---|---|---|
| 7,975,020 B1 | 7/2011 | Green et al. |
| 8,010,422 B1 | 8/2011 | Lascelles et al. |
| 8,065,666 B2* | 11/2011 | Schnabele .......... G05B 19/4183 717/127 |
| 8,166,026 B1 | 4/2012 | Sadler |
| 8,185,544 B2 | 5/2012 | Oztekin et al. |
| 8,260,846 B2 | 9/2012 | Lahav |
| 8,266,127 B2 | 9/2012 | Mattox et al. |
| 8,321,906 B2 | 11/2012 | Angrusa |
| 8,386,340 B1 | 2/2013 | Feinstein |
| 8,386,509 B1 | 2/2013 | Scofield |
| 8,392,580 B2 | 3/2013 | Allen et al. |
| 8,738,732 B2 | 5/2014 | Karidi |
| 8,762,313 B2 | 6/2014 | Lahav et al. |
| 8,799,200 B2 | 8/2014 | Lahav |
| 8,805,844 B2 | 8/2014 | Schorzman et al. |
| 8,805,941 B2 | 8/2014 | Barak et al. |
| 8,843,481 B1 | 9/2014 | Xu |
| 8,868,448 B2 | 10/2014 | Freishtat et al. |
| 8,918,465 B2 | 12/2014 | Barak |
| 8,943,002 B2 | 1/2015 | Zelenko et al. |
| 8,943,145 B1 | 1/2015 | Peters et al. |
| 8,954,539 B2 | 2/2015 | Lahav |
| 8,965,998 B1 | 2/2015 | Dicker |
| 9,104,970 B2 | 8/2015 | Lahav et al. |
| 9,256,761 B1 | 2/2016 | Sahu |
| 9,331,969 B2 | 5/2016 | Barak et al. |
| 9,336,487 B2 | 5/2016 | Lahav |
| 9,350,598 B2 | 5/2016 | Barak et al. |
| 9,396,295 B2 | 7/2016 | Lahav et al. |
| 9,396,436 B2 | 7/2016 | Lahav |
| 9,432,468 B2 | 8/2016 | Karidi |
| 9,525,745 B2 | 12/2016 | Karidi |
| 9,558,276 B2 | 1/2017 | Barak et al. |
| 9,563,336 B2 | 2/2017 | Barak et al. |
| 9,563,707 B2 | 2/2017 | Barak et al. |
| 9,569,537 B2 | 2/2017 | Barak et al. |
| 9,576,292 B2 | 2/2017 | Freishtat et al. |
| 9,582,579 B2 | 2/2017 | Barak et al. |
| 9,590,930 B2 | 3/2017 | Karidi |
| 9,672,196 B2 | 6/2017 | Shachar et al. |
| 9,767,212 B2 | 9/2017 | Lavi et al. |
| 2001/0011245 A1 | 8/2001 | Duhon |
| 2001/0011246 A1 | 8/2001 | Tammaro |
| 2001/0011262 A1 | 8/2001 | Hoyt et al. |
| 2001/0011282 A1 | 8/2001 | Katsumata et al. |
| 2001/0013009 A1 | 8/2001 | Greening et al. |
| 2001/0014877 A1 | 8/2001 | Defrancesco et al. |
| 2001/0025249 A1 | 9/2001 | Tokunaga |
| 2001/0027436 A1 | 10/2001 | Tenembaum |
| 2001/0032140 A1 | 10/2001 | Hoffman |
| 2001/0032244 A1 | 10/2001 | Neustel |
| 2001/0034689 A1 | 10/2001 | Heilman |
| 2001/0044751 A1 | 11/2001 | Pugliese |
| 2001/0054041 A1 | 12/2001 | Chang |
| 2001/0054064 A1 | 12/2001 | Kannan |
| 2001/0056405 A1 | 12/2001 | Muyres |
| 2002/0002491 A1 | 1/2002 | Whitfield |
| 2002/0004735 A1 | 1/2002 | Gross |
| 2002/0010625 A1 | 1/2002 | Smith et al. |
| 2002/0016731 A1 | 2/2002 | Kupersmit |
| 2002/0023051 A1 | 2/2002 | Kunzle et al. |
| 2002/0026351 A1 | 2/2002 | Coleman |
| 2002/0029188 A1 | 3/2002 | Schmid |
| 2002/0029267 A1 | 3/2002 | Sankuratripati et al. |
| 2002/0035486 A1 | 3/2002 | Huyn et al. |
| 2002/0038230 A1 | 3/2002 | Chen |
| 2002/0045154 A1 | 4/2002 | Wood |
| 2002/0046086 A1 | 4/2002 | Pletz |
| 2002/0046096 A1 | 4/2002 | Srinivasan |
| 2002/0047859 A1 | 4/2002 | Szlam et al. |
| 2002/0055878 A1 | 5/2002 | Burton et al. |
| 2002/0059095 A1 | 5/2002 | Cook |
| 2002/0067500 A1 | 6/2002 | Yokomizo et al. |
| 2002/0073162 A1 | 6/2002 | McErlean |
| 2002/0082923 A1 | 6/2002 | Merriman et al. |
| 2002/0083095 A1 | 6/2002 | Wu et al. |
| 2002/0083167 A1 | 6/2002 | Costigan et al. |
| 2002/0085705 A1 | 7/2002 | Shires |
| 2002/0091832 A1 | 7/2002 | Low et al. |
| 2002/0107728 A1 | 8/2002 | Bailey et al. |
| 2002/0111847 A1 | 8/2002 | Smith |
| 2002/0111850 A1 | 8/2002 | Smrcka et al. |
| 2002/0123926 A1 | 9/2002 | Bushold |
| 2002/0161620 A1 | 10/2002 | Hatanaka |
| 2002/0161651 A1 | 10/2002 | Godsey |
| 2002/0161664 A1 | 10/2002 | Shaya et al. |
| 2002/0167539 A1 | 11/2002 | Brown et al. |
| 2003/0004781 A1 | 1/2003 | Mallon |
| 2003/0009768 A1 | 1/2003 | Moir |
| 2003/0011641 A1 | 1/2003 | Totman et al. |
| 2003/0014304 A1 | 1/2003 | Calvert et al. |
| 2003/0023754 A1 | 1/2003 | Eichstadt et al. |
| 2003/0028415 A1 | 2/2003 | Herschap et al. |
| 2003/0036949 A1 | 2/2003 | Kaddeche et al. |
| 2003/0041056 A1 | 2/2003 | Bossemeyer et al. |
| 2003/0055778 A1 | 3/2003 | Erlanger |
| 2003/0061091 A1 | 3/2003 | Amaratunga |
| 2003/0079176 A1 | 4/2003 | Kang et al. |
| 2003/0105826 A1 | 6/2003 | Mayraz |
| 2003/0110130 A1 | 6/2003 | Pelletier |
| 2003/0140037 A1 | 7/2003 | Deh-Lee |
| 2003/0149581 A1 | 8/2003 | Chaudhri et al. |
| 2003/0149937 A1 | 8/2003 | McElfresh et al. |
| 2003/0154196 A1 | 8/2003 | Goodwin et al. |
| 2003/0167195 A1 | 9/2003 | Fernandes et al. |
| 2003/0177096 A1 | 9/2003 | Trent et al. |
| 2003/0195848 A1 | 10/2003 | Felger |
| 2003/0217332 A1 | 11/2003 | Smith et al. |
| 2003/0221163 A1 | 11/2003 | Glover et al. |
| 2003/0233425 A1 | 12/2003 | Lyons et al. |
| 2004/0034567 A1 | 2/2004 | Gravett |
| 2004/0064412 A1 | 4/2004 | Phillips et al. |
| 2004/0073475 A1 | 4/2004 | Tupper |
| 2004/0088323 A1 | 5/2004 | Elder et al. |
| 2004/0128390 A1 | 7/2004 | Blakley et al. |
| 2004/0141016 A1 | 7/2004 | Fukatsu et al. |
| 2004/0153368 A1 | 8/2004 | Freishtat et al. |
| 2004/0163101 A1 | 8/2004 | Swix et al. |
| 2004/0167928 A1 | 8/2004 | Anderson et al. |
| 2004/0193377 A1 | 9/2004 | Brown |
| 2004/0210820 A1 | 10/2004 | Tarr et al. |
| 2004/0243539 A1 | 12/2004 | Skurtovich et al. |
| 2004/0249650 A1 | 12/2004 | Freedman et al. |
| 2004/0260574 A1 | 12/2004 | Gross |
| 2005/0004864 A1 | 1/2005 | Lent et al. |
| 2005/0014117 A1 | 1/2005 | Stillman |
| 2005/0033641 A1 | 2/2005 | Jha et al. |
| 2005/0033728 A1 | 2/2005 | James |
| 2005/0044149 A1 | 2/2005 | Regardie et al. |
| 2005/0091254 A1 | 4/2005 | Stabb |
| 2005/0096963 A1 | 5/2005 | Myr |
| 2005/0096997 A1 | 5/2005 | Jain et al. |
| 2005/0097089 A1 | 5/2005 | Nielsen et al. |
| 2005/0102177 A1 | 5/2005 | Takayama |
| 2005/0114195 A1 | 5/2005 | Bernasconi |
| 2005/0131944 A1 | 6/2005 | Edward |
| 2005/0132205 A1 | 6/2005 | Palliyil et al. |
| 2005/0138115 A1 | 6/2005 | Llamas et al. |
| 2005/0171861 A1 | 8/2005 | Bezos et al. |
| 2005/0183003 A1 | 8/2005 | Peri |
| 2005/0198120 A1 | 9/2005 | Reshef et al. |
| 2005/0198212 A1 | 9/2005 | Zilberfayn et al. |
| 2005/0198220 A1 | 9/2005 | Wada et al. |
| 2005/0216342 A1 | 9/2005 | Ashbaugh |
| 2005/0234761 A1 | 10/2005 | Pinto |
| 2005/0256955 A1 | 11/2005 | Bodwell et al. |
| 2005/0262065 A1 | 11/2005 | Barth et al. |
| 2005/0273388 A1 | 12/2005 | Roetter |
| 2005/0288943 A1 | 12/2005 | Wei et al. |
| 2006/0015390 A1 | 1/2006 | Rijsinghani et al. |
| 2006/0021009 A1 | 1/2006 | Lunt |
| 2006/0026147 A1 | 2/2006 | Cone et al. |
| 2006/0026237 A1 | 2/2006 | Wang et al. |

(56) References Cited

U.S. PATENT DOCUMENTS

| | | |
|---|---|---|
| 2006/0041378 A1 | 2/2006 | Chen |
| 2006/0041476 A1 | 2/2006 | Zheng |
| 2006/0041562 A1 | 2/2006 | Paczkowski et al. |
| 2006/0047615 A1 | 3/2006 | Ravin et al. |
| 2006/0059124 A1 | 3/2006 | Krishna |
| 2006/0106788 A1 | 5/2006 | Forrest |
| 2006/0122850 A1 | 6/2006 | Ward et al. |
| 2006/0168509 A1 | 7/2006 | Boss et al. |
| 2006/0224750 A1 | 10/2006 | Davies |
| 2006/0253319 A1 | 11/2006 | Chayes et al. |
| 2006/0265495 A1 | 11/2006 | Butler et al. |
| 2006/0271545 A1 | 11/2006 | Youn et al. |
| 2006/0277477 A1 | 12/2006 | Christenson |
| 2006/0282327 A1 | 12/2006 | Neal et al. |
| 2006/0282328 A1 | 12/2006 | Gerace et al. |
| 2006/0284378 A1 | 12/2006 | Snow et al. |
| 2006/0284892 A1 | 12/2006 | Sheridan |
| 2006/0288087 A1 | 12/2006 | Sun |
| 2006/0293950 A1 | 12/2006 | Meek et al. |
| 2007/0027771 A1 | 2/2007 | Collins et al. |
| 2007/0027785 A1 | 2/2007 | Lent et al. |
| 2007/0053513 A1 | 3/2007 | Hoffberg |
| 2007/0061412 A1 | 3/2007 | Karidi et al. |
| 2007/0061421 A1 | 3/2007 | Karidi |
| 2007/0073585 A1 | 3/2007 | Apple et al. |
| 2007/0094228 A1 | 4/2007 | Nevin et al. |
| 2007/0100653 A1 | 5/2007 | Ramer et al. |
| 2007/0100688 A1 | 5/2007 | Book |
| 2007/0116238 A1 | 5/2007 | Jacobi |
| 2007/0116239 A1 | 5/2007 | Jacobi |
| 2007/0162501 A1 | 7/2007 | Agassi et al. |
| 2007/0162846 A1 | 7/2007 | Cave |
| 2007/0168874 A1 | 7/2007 | Kloeffer |
| 2007/0185751 A1 | 8/2007 | Dempers |
| 2007/0206086 A1 | 9/2007 | Baron et al. |
| 2007/0239527 A1 | 10/2007 | Nazer et al. |
| 2007/0250585 A1 | 10/2007 | Ly et al. |
| 2007/0256003 A1 | 11/2007 | Wagoner |
| 2007/0260596 A1 | 11/2007 | Koran et al. |
| 2007/0260624 A1 | 11/2007 | Chung et al. |
| 2007/0265873 A1 | 11/2007 | Sheth et al. |
| 2008/0021816 A1 | 1/2008 | Lent et al. |
| 2008/0033794 A1 | 2/2008 | Ou et al. |
| 2008/0033941 A1 | 2/2008 | Parrish |
| 2008/0040225 A1 | 2/2008 | Roker |
| 2008/0072170 A1 | 3/2008 | Simons |
| 2008/0133650 A1 | 6/2008 | Saarimaki et al. |
| 2008/0147480 A1 | 6/2008 | Sarma et al. |
| 2008/0147486 A1 | 6/2008 | Wu et al. |
| 2008/0147741 A1 | 6/2008 | Gonen et al. |
| 2008/0183745 A1 | 7/2008 | Cancel et al. |
| 2008/0183806 A1 | 7/2008 | Cancel et al. |
| 2008/0201436 A1 | 8/2008 | Gartner |
| 2008/0215541 A1 | 9/2008 | Li et al. |
| 2008/0222656 A1 | 9/2008 | Lyman |
| 2008/0244024 A1 | 10/2008 | Aaltonen et al. |
| 2008/0262897 A1 | 10/2008 | Howarter et al. |
| 2008/0270294 A1 | 10/2008 | Lent et al. |
| 2008/0270295 A1 | 10/2008 | Lent et al. |
| 2008/0275864 A1 | 11/2008 | Kim |
| 2008/0288658 A1 | 11/2008 | Banga |
| 2008/0319778 A1 | 12/2008 | Abhyanker |
| 2009/0006174 A1 | 1/2009 | Lauffer |
| 2009/0006179 A1 | 1/2009 | Billingsley et al. |
| 2009/0006622 A1 | 1/2009 | Doerr |
| 2009/0030859 A1 | 1/2009 | Buchs et al. |
| 2009/0037355 A1 | 2/2009 | Brave |
| 2009/0055267 A1 | 2/2009 | Roker |
| 2009/0063645 A1 | 3/2009 | Casey et al. |
| 2009/0076887 A1 | 3/2009 | Spivack et al. |
| 2009/0099904 A1 | 4/2009 | Affeld et al. |
| 2009/0119173 A1 | 5/2009 | Parsons et al. |
| 2009/0132368 A1 | 5/2009 | Cotter et al. |
| 2009/0138563 A1 | 5/2009 | Zhu |
| 2009/0138606 A1 | 5/2009 | Moran et al. |
| 2009/0164171 A1 | 6/2009 | Wold et al. |
| 2009/0177771 A1 | 7/2009 | Britton et al. |
| 2009/0210405 A1 | 8/2009 | Ortega et al. |
| 2009/0222572 A1 | 9/2009 | Fujihara |
| 2009/0228914 A1 | 9/2009 | Wong |
| 2009/0240586 A1 | 9/2009 | Ramer et al. |
| 2009/0287534 A1 | 11/2009 | Guo et al. |
| 2009/0287633 A1 | 11/2009 | Nevin et al. |
| 2009/0293001 A1 | 11/2009 | Lu et al. |
| 2009/0298480 A1 | 12/2009 | Khambete |
| 2009/0307003 A1 | 12/2009 | Benjamin |
| 2009/0319296 A1 | 12/2009 | Schoenberg |
| 2009/0327863 A1 | 12/2009 | Holt et al. |
| 2010/0023475 A1 | 1/2010 | Lahav |
| 2010/0023581 A1 | 1/2010 | Lahav |
| 2010/0049602 A1 | 2/2010 | Softky |
| 2010/0063879 A1 | 3/2010 | Araradian et al. |
| 2010/0106552 A1 | 4/2010 | Barillaud |
| 2010/0125657 A1 | 5/2010 | Dowling et al. |
| 2010/0169176 A1 | 7/2010 | Turakhia |
| 2010/0169342 A1 | 7/2010 | Kenedy |
| 2010/0205024 A1 | 8/2010 | Shachar et al. |
| 2010/0211579 A1 | 8/2010 | Fujioka |
| 2010/0255812 A1 | 10/2010 | Nanjundaiah et al. |
| 2010/0262558 A1 | 10/2010 | Wilcock |
| 2010/0281008 A1 | 11/2010 | Braunwarth |
| 2010/0306043 A1 | 12/2010 | Lindsay et al. |
| 2011/0041168 A1 | 2/2011 | Murray et al. |
| 2011/0055207 A1 | 3/2011 | Schorzman et al. |
| 2011/0055331 A1 | 3/2011 | Adelman et al. |
| 2011/0055338 A1 | 3/2011 | Loeb et al. |
| 2011/0112893 A1 | 5/2011 | Karlsson et al. |
| 2011/0113101 A1 | 5/2011 | Ye et al. |
| 2011/0119264 A1 | 5/2011 | Hu et al. |
| 2011/0131077 A1 | 6/2011 | Tan |
| 2011/0137733 A1 | 6/2011 | Baird et al. |
| 2011/0138298 A1 | 6/2011 | Alfred et al. |
| 2011/0161792 A1 | 6/2011 | Florence et al. |
| 2011/0208822 A1 | 8/2011 | Rathod |
| 2011/0246255 A1 | 10/2011 | Gilbert et al. |
| 2011/0246406 A1 | 10/2011 | Lahav et al. |
| 2011/0258039 A1 | 10/2011 | Patwa et al. |
| 2011/0270926 A1 | 11/2011 | Boyd |
| 2011/0271175 A1 | 11/2011 | Lavi et al. |
| 2011/0307331 A1 | 12/2011 | Richard et al. |
| 2011/0320715 A1 | 12/2011 | Ickman et al. |
| 2012/0012358 A1 | 1/2012 | Horan et al. |
| 2012/0036200 A1 | 2/2012 | Cole |
| 2012/0042389 A1 | 2/2012 | Bradley et al. |
| 2012/0059722 A1 | 3/2012 | Rao |
| 2012/0066345 A1 | 3/2012 | Rayan |
| 2012/0130918 A1 | 5/2012 | Gordon |
| 2012/0136939 A1 | 5/2012 | Stern et al. |
| 2012/0150973 A1 | 6/2012 | Barak |
| 2012/0173373 A1 | 7/2012 | Soroca |
| 2012/0195422 A1 | 8/2012 | Famous |
| 2012/0254301 A1 | 10/2012 | Fiero |
| 2012/0259891 A1 | 10/2012 | Edoja |
| 2012/0323346 A1 | 12/2012 | Ashby et al. |
| 2013/0013362 A1 | 1/2013 | Walker et al. |
| 2013/0036202 A1 | 2/2013 | Lahav |
| 2013/0054707 A1 | 2/2013 | Muszynski et al. |
| 2013/0117276 A1 | 5/2013 | Hedditch |
| 2013/0117804 A1 | 5/2013 | Chawla |
| 2013/0132194 A1 | 5/2013 | Rajaram |
| 2013/0165234 A1 | 6/2013 | Hall |
| 2013/0182834 A1 | 7/2013 | Lauffer |
| 2013/0204859 A1 | 8/2013 | Vijaywargi et al. |
| 2013/0212497 A1 | 8/2013 | Zelenko et al. |
| 2013/0238714 A1 | 9/2013 | Barak et al. |
| 2013/0268468 A1 | 10/2013 | Vijayaraghavan et al. |
| 2013/0275862 A1 | 10/2013 | Adra |
| 2013/0290533 A1 | 10/2013 | Barak |
| 2013/0311874 A1 | 11/2013 | Schachar et al. |
| 2013/0326375 A1 | 12/2013 | Barak et al. |
| 2013/0336471 A1 | 12/2013 | Agarwal et al. |
| 2013/0339445 A1 | 12/2013 | Perincherry |
| 2014/0068011 A1 | 3/2014 | Zhang et al. |
| 2014/0115466 A1 | 4/2014 | Barak et al. |

(56) References Cited

U.S. PATENT DOCUMENTS

| | | |
|---|---|---|
| 2014/0222888 A1 | 8/2014 | Karidi |
| 2014/0250051 A1 | 9/2014 | Lahav et al. |
| 2014/0278795 A1 | 9/2014 | Satyamoorthy |
| 2014/0310229 A1 | 10/2014 | Lahav et al. |
| 2014/0372240 A1 | 12/2014 | Freishtat et al. |
| 2015/0012602 A1 | 1/2015 | Barak et al. |
| 2015/0012848 A1 | 1/2015 | Barak et al. |
| 2015/0019525 A1 | 1/2015 | Barak et al. |
| 2015/0019527 A1 | 1/2015 | Barak et al. |
| 2015/0149571 A1 | 5/2015 | Barak et al. |
| 2015/0200822 A1 | 7/2015 | Zelenko et al. |
| 2015/0213363 A1 | 7/2015 | Lahav et al. |
| 2015/0248486 A1 | 9/2015 | Barak et al. |
| 2015/0269609 A1 | 9/2015 | Mehanian |
| 2015/0278837 A1 | 10/2015 | Lahav et al. |
| 2016/0055277 A1 | 2/2016 | Lahav et al. |
| 2016/0117736 A1 | 4/2016 | Barak et al. |
| 2016/0248706 A1 | 8/2016 | Karidi |
| 2016/0380932 A1 | 12/2016 | Matan et al. |
| 2017/0011146 A1 | 1/2017 | Lahav et al. |
| 2017/0046021 A1 | 2/2017 | Karidi |
| 2017/0054701 A1 | 2/2017 | Barak et al. |
| 2017/0169081 A1 | 6/2017 | Barak et al. |
| 2017/0171047 A1 | 6/2017 | Freishtat et al. |
| 2017/0206568 A1 | 7/2017 | Schachar et al. |

FOREIGN PATENT DOCUMENTS

| | | |
|---|---|---|
| EP | 1276 064 A2 | 1/2003 |
| EP | 1549025 A1 | 6/2005 |
| EP | 1 840 803 A1 | 10/2007 |
| EP | 1845436 A2 | 10/2007 |
| EP | 1850284 A1 | 10/2007 |
| FR | 2 950 214 A1 | 3/2011 |
| JP | 9288453 A2 | 11/1997 |
| JP | 2004-054533 | 2/2004 |
| JP | 2010/128877 | 6/2010 |
| KR | 20040110399 A | 12/2004 |
| KR | 20050010487 A | 1/2005 |
| KR | 20080046310 A | 5/2008 |
| KR | 20080097751 A | 11/2008 |
| WO | 9722073 A1 | 6/1997 |
| WO | 9845797 A2 | 10/1998 |
| WO | 9909470 A1 | 2/1999 |
| WO | 9922328 A1 | 5/1999 |
| WO | 9944152 A1 | 9/1999 |
| WO | 00/57294 A1 | 9/2000 |
| WO | 0127825 A1 | 4/2001 |
| WO | 2001/035272 A2 | 5/2001 |
| WO | 02/065367 A2 | 8/2002 |
| WO | 03/032146 A1 | 4/2003 |
| WO | 2004/057473 A1 | 7/2004 |
| WO | 2005/059777 A1 | 6/2005 |
| WO | 2007/044757 A1 | 4/2007 |
| WO | 2007/129625 A1 | 11/2007 |
| WO | 2008/057181 A2 | 5/2008 |
| WO | 2008/143382 A1 | 11/2008 |
| WO | 2009/029940 A1 | 3/2009 |
| WO | 2010/099632 A1 | 9/2010 |
| WO | 2010/119379 A1 | 10/2010 |
| WO | 2010/144207 A2 | 12/2010 |
| WO | 2011/127049 A1 | 10/2011 |
| WO | 2013/119808 A1 | 8/2013 |
| WO | 2013/158830 A1 | 10/2013 |
| WO | 2013/163426 A1 | 10/2013 |
| WO | 2015/021068 A2 | 2/2015 |

OTHER PUBLICATIONS

Just Answer (2004 Faq) Archive.org cache of www.justanswer.com circa (Dec. 2004), 8 pages.
Pack Thomas, "Human Search Engines the next Killer app," (Dec. 1, 2000) Econtent DBS vol. 23; Issue 6, 7 pages.
match.com "Match.com Launches Match.com Advisors," PR Newswire (Oct. 14, 2003), 2 pages.
Sitel, "Sitel to Provide Live Agent Support Online for Expertcity.com," PR Newswire (Feb. 28, 2000), 2 pages.
Webmaster World, "Link to my website is in a frame with banner ad at the top," www.webmasterworld.com (Nov. 11, 2003), 2 pages.
Bry et al., "Realilzing Business Processes with ECA Rules: Benefits, Challenges, Limits," Principles and Practice of Sematic Web Reasoning Lecture Notes in Computer Science, pp. 48-62, LNCS, Springer, Berlin, DE (Jan. 2006).
Fairisaac, "How SmartForms for Blaze Advisor Works," www.fairisaac.com 12 pages (Jan. 2005).
Mesbah A et al., "A Component-and Push-Based Architectural Style for Ajax Applications," The Journal of Systems & Software, 81 (12): pp. 2194-2209, Elsevier North Holland, New York, NY US (Dec. 2008).
Oracle Fusion Middleware Administrator's Guide for Oracle SOA (Oracle Guide) Suite 11g Release 1 (11.1.1) Part No. E10226-02 www.docs.oracle.com (Oct. 2009), 548 pages.
"OAuth core 1.0 Revision A [XP002570263]," OAuth Core Workgroups, pp. 1-27 www.ouath.net/core/1.0a/ (retrieved Jan. 31, 2013), 24 pages.
Anon., "AnswerSoft Announces Concerto; First to Combine Call Center Automation with Power of Web," Business Wire, (Feb. 3, 1997) 3 pages.
Emigh, J., "AnswerSoft Unveils Concerto for Web-Based Call Centers Feb. 5, 1996," Newsbytes, (Feb. 5, 1997) 2 pages.
Grigonis, R., "Webphony-It's not Just Callback Buttons Anymore," Computer Telephony, (Dec. 1997) 4 pages.
Wagner, M., "Caring for Customers," Internet World, (Sep. 1, 1999) 3 pages.
Sweat, J., "Human Touch-A New Wave of E-Service Offerings Blends the Web, E-Mail, and Voice Bringing People back into the Picture," Information week, (Oct. 4, 1999) 2 pages.
Kirkpatrick, K., "Electronic Exchange 2000, The, " Computer Shopper, (Nov. 1999) 5 pages.
Anon., "InstantService.com Teams with Island Data to provide Integrated Solution for Online Customer Response," Business Wire, (May 22, 2000) 3 pages.
Kersnar, S., "Countrywide Offers Proprietary Technology for Online Wholesale Lending," National Mortgage News, vol. 24, No. 38, (Jun. 5, 2000) 2 pages.
Douglas Armstrong, Firstar Web site helps add up future, Milwaukee Journal Sentinel, (Mar. 28, 1996) 3 pages.
redhat .com downloaded on Jul. 23, 2006.
apache.org downloaded on Jul. 23, 2006.
mysql.com downloaded on Jul. 23, 2006.
developer.com downloaded on Jul. 23, 2006.
Canter, Ronald S., "Lender Beware-Federal Regulation of Consumer Credit", Credit World, vol. 81, No. 5, pp. 16-20, (May 1993).
Staff, "On-Line System Approves Loans While Customer Waits," Communication News, vol. 31, Issue 9, (Sep. 1994) 3 pages.
"Low-Rent Loan Officer in a Kiosk", Bank Technology News vol. 8 No. 2, p (Feb. 1995) 2 pages.
Duclaux, Denise, "A Check for $5,000 in Ten Minutes", ABA Banking Journal, vol. 87, No. 8, p. 45, AUQ. (1995) 2 pages.
"World Wide Web Enhances Customer's Choice", Cards International, No. 143, p. 9, (Nov. 1995) 2 pages.
Wells Fargo Launches First Real-Time, Online Home Equity Credit Decision-Making Service , Business Wire, (Jun. 3, 1998), Dialog_ File 621: New Product Announcement, 3 pages.
Handley, John, "Credit Review Lets the Nos. Do the Talking in Home Mortgage Game", Chicago Tribune (Jul. 1998) 3 pages.
Sherman, Lee, "Wells Fargo Writes a New Online Script", Interactive Week, vol. 5, No. 31, p. 29, (Aug. 1998) 2 pages.
Calvey, Mark, "Internet Gives Bankers a Snappy Comeback", San Francisco Business Times, vol. 13, No. 5, p. 3 (Sep. 1998) 2 pages.
McCormick, Linda, "Users of Credit Scoring Face Tough Rules on Notification", American Banker, Dialog File 625: American Banker Publications, (Mar. 21, 1982) 2 pages.

(56) References Cited

OTHER PUBLICATIONS

What the Credit Bureau is Saying About You: If a Mistake Sneaks Into Your Record, You May Not Know About it Until You Get Turned Down for Credit , Changing Times, vol. 37, p. 56, (Jul. 1983) 2 pages.
McShane. Peter K., "Got Financing?", Business Journal Serving Southern Tier, CNY, Mohawk Valley, Finger Lakes. North, vol. 11, Issue 19, p. 9, (Sep. 15, 1997) 3 pages.
Borowsky, Mark, "The Neural Net: Predictor of Fraud or Victim of Hype?", Bank Technology News DialoQ File 16:PROMT, p. 7 (Sep. 1993) 2 pages.
FICO http://houseloans.idis.com/fico (2009) 1 page.
Altavista: search, FICO http://www.altavista.com (2001) 3 pages.
What Do FICO Scores Mean to Me?, http://www.sancap.com. (1999) 3 pages.
What is a FICO Score?, http://www.aspeenloan.com (2009) 1 page.
"Credit", The New Encyclopedia Britannica vol. 3 p. 722. (1994) 3 pages.
"Creditnet.com—An Online Guide to Credit Cards", http://www.creditnet/com. (1999) 1 page.
"Phillips 66 Introduces Mastercard with Rebate Feature", PR Newswire, p914NY067, (Sep. 14, 1995) 1 page.
Anon, "VAR Agreement Expands Credit Bureau Access.", (CCS America, Magnum Communications Ltd expand CardPac access, Computers in Banking, v6, n10, (1) (Oct. 1989) 2 pages.
Wortmann, Harry S., "Reengineering Update—Outsourcing: An Option Full of Benefits and Responsibilities", American Banker, (Oct. 24, 1994), p. 7A vol. 159, No. 205 3 pages.
Anon. "To Boost Balances, AT&T Renews No-Fee Universal Credit Card Offer", Gale Group Newsletter, V 10, N. 13, (Mar. 30, 1992) 2 pages.
Anon. "Citgo Puts a New Spin on the Cobranded Oil Card", Credit Card News, p. 4, (Nov. 1, 1995) 2 pages.
Anon. "Microsoft Targets More than PIM Market with Outlook 2000," Computer Reseller News, N. 805 pp. 99, (Aug. 31, 1998) 2 pages.
Chesanow, Neil, "Pick the Right Credit Cards—and use them wisely", Medical Economics, v. 75, n. 16, p. 94, (Aug. 24, 1998) 4 pages.
Friedland, Marc, "Credit Scoring Digs Deeper into Data", Credit World, v. 84, n. 5 p. 19-23, (May 1996) 5 pages.
Hollander, Geoffrey, "Sibling Tool Personator 3 untangles File Formats", InfoWorld, v20, n5, pp. 102 (Feb. 2, 1998) 2 pages.
Kantrow, Yvette D., "Banks Press Cardholders to Take Cash Advances", American Banker, v. 157, n. 18 pp. 1-2. (Jan. 28, 1992) 2 pages.
Lotus News Release: "Lotus Delivers Pre-Release of Lotus Notes 4.6 Client Provides Compelling New Integration with Internet Explorer", (May 20, 1997) 2 pages.
Stetenfeld, Beth, "Credit Scoring: Finding the Right Recipe", Credit Union Management, v. 17, n 11, pp. 24-26 (Nov. 1994).
Block, Valerie, "Network Assembles Card Issuers at an Internet Site", Am. Banker, V160, (1998) 1 page.
CreditNet Financial Network http://consumers.creditnet.com (1999) 1 page.
Anon., "Lending Tree: Lending Tree Provides Borrowers Fast and Easy Online Access to Multiple Loan Offers," Business Wire, Jun. 23, 1998, 2 pages.
Anon, Regulation Z Commentary Amendments, Retail Banking Digest, vol. 15, No. 2, p. 17-18, (Mar.-Apr. 1995).
Anon, San Diego Savings Association Offers Customers No-Fee Visa Product, Card News, (Feb. 29, 1988) 1 page.
Bloom, J.K., "For This New Visa, Only Web Surfers Need Apply," American Banker, vol. 1163, No. 34 12 (Feb. 20, 1998) 2 pages.
Harney, K.R., "Realty Brokers, Lenders Face Restrictions," Arizona Republic, Final Chaser edition, Sun Living section, (Feb. 10, 1991) 2 pages.
Higgins, K.T., "Mr. Plastic Joins the Marketing Team," Credit Card Management, vol. 6, No. 3, pp. 26-30, Jun. 1993.

Microsoft Press Computer Dictionary, Third Edition, Microsoft Press, Redmond, 1997, 4 pages.
Whiteside, D.E., "One Million and Counting," Collections and Credit Risk, vol. 1, No. 11 (Nov. 1996) 5 pages.
Fickenscher, L., "Providian Undercuts rivals with 7.9% Rate Offer," American banker, vol. 163, Oct. 8, 1998, 2 pages.
Fargo, J., "The Internet Specialists," Credit Card Management, vol. 11, No. 10, pp. 38-45, Jan. 1999.
Lemay, T., "Browsing for a Mortgage a Click away," Financial Post, (Jan. 15, 2000) 1 page.
Wijnen, R., "Banks Fortify Online Services," Bank Technology News, vol. 13, No. 3, Mar. 2000, 3 pages.
Anon. "IAFC Launches NextCard, The First True Internet VISA," Business Wire, New York: (Feb. 6, 1998), 3 pages.
Lazarony, Lucy, "Only Online Applicants Need Apply," Bank Advertising News, North Palm Beach, Mar. 23, 1998, vol. 21, Issue 15, 3 pages.
FIData, Inc., News & Press Releases, "Instant Credit Union Loans via the Internet," http://web.archive.org/web/19990221115203/www.fidata-inc.com/news-pr01.htm (1999) 2 pages.
FIData, Inc., Press Releases, "Instant Loan Approvals via the Internet," http://www.fidata-_inc.com/news/pr_040198.htm (Apr. 1, 1998) 2 pages.
Staff, "On-Line System Approves Loans While Customer Waits"—Abstract, Communication News, vol. 31, Issue 9, (Sep. 1994) 3 pages.
Anon. "Affordable Lending Systems Now Available for Smaller Financial Institutions," Business Wire, (May 18, 1998), 2 pages.
Nexis—All News Sources—Examiner's NPL Search Results in U.S. Appl. No. 11/932,498, included with Office Action dated Oct. 8, 2008, 14 pages.
"Sample Experian Credit Report" by Consumer Information consumerinfo.com (Jul. 9, 1998) 4 pages.
Plaintiffs Original Complaint, *Nextcard, LLC v. Liveperson, Inc.*; Civil Action No. 2:08-cv-00184-TJW, In the U.S. District Court for the Eastern District of Texas, Marshall Division, filed Apr. 30, 2008 (7 pages).
Amended Complaint and Jury Demand; *Liveperson, Inc. v. Nextcard, LLC, et al.*; Civil Action No. 08-062 (GMS), in the U.S. District Court for the District of Delaware, filed Mar. 18, 2008 (5 pages).
Plaintiffs Second Amended Complaint; *Nextcard, LLC v. American Express Company, et al*; Civil Action No. 2:07-cv-354 (TJW); In the U.S. District Court for the Eastern District of Texas, Marshall Division, filed Apr. 9, 2008 (12 pages).
Defendants HSBC North America Holdings Inc.'s and HSBC USA Inc's Answer, Affirmative Defenses and Counterclaims to Plaintiffs Second Amended Complaint; *Nextcard, LLC v. American Express Company, et al*; Civil Action No. 2:07-cv-354 (TJW); In the U.S. District Court for the Eastern District of Texas, Marshall Division filed (Apr. 28, 2008), 13 pages.
Answer and Counterclaims of Defendant *DFS Services LLC; Nextcard, LLC v. American Express Company, et al*; Civil Action No. 2:07-cv-354 (TJW); In the U.S. District Court for the Eastern District of Texas, Marshall Division, filed Apr. 28, 2008 (13 pages).
Defendant The PNC Financial Services Group, Inc.'s Answer and Affirmative Defenses to Second Amended Complaint; *Nextcard, LLC v. American Express Company, et al*; Civil Action No. 2:07-cv-354 (TJW); In the U.S. District Court for the Eastern District of Texas, Marshall Division, filed Apr. 28, 2008, 10 pages.
Plaintiffs Second Amended Reply to Counterclaims of Defendants *HSBC North America Holdings Inc. and HSBC USA Inc.; Nextcard, LLC v. American Express Company, et al*; Civil Action No. 2:07-cv-354 (TJW); In the U.S. District Court for the Eastern District of Texas, Marshall Division, filed May 14, 2008, 5 pages.
Plaintiffs Second Amended Reply to Counterclaims of Defendant *DFS Services LLC; Nextcard, LLC v. American Express Company, et al*; Civil Action No. 2:07-cv-354 (TJW); In the U.S. District Court for the Eastern District of Texas, Marshall Division, filed May 14, 2008 (71 pages).
Plaintiffs Second Amended Reply to Counterclaims of Defendant American Express Company; *Nextcard, LLC v. American Express*

(56) References Cited

OTHER PUBLICATIONS

Company, et al; Civil Action No. 2:07-cv-354 (TJW); In the U.S. District Court for the Eastern District of Texas, Marshall Division, filed (May 8, 2008), 8 pages.
Justin Hibbard, Gregory Dalton, Mary E Thyfault. (Jun. 1998). "Web-based customer care." Information Week, (684) 18-20, 3 pages.
Kim S. Nash "Call all Customers." Computerworld, 32 (1), 25-28 (Dec. 1997), 2 pages.
PRN: "First American Financial Acquires Tele-Track Inc.," PR Newswire, (May 11, 1999), Proquest #41275773, 2 pages.
Young, Deborah, "The Information Store," (Sep. 15, 2000), Wireless Review, pp. 42, 44, 46, 48, 50.
Whiting et al., "Profitable Customers," (Mar. 29, 1999), Information Week, Issue 727, pp. 44, 45, 48, 52, 56.
Bayer, Judy, "A Framework for Developing and Using Retail Promotion Response Models," Cares Integrated Solutions, retrieved from www.ceresion.com (2007) 5 pages.
Bayer, Judy, "Automated Response Modeling System for Targeted Marketing," (Mar. 1998), Ceres Integrated Solutions, 5 pages.
Sweet et al., "Instant Marketing," (Aug. 12, 1999), Information Week, pp. 18-20.
SmartKids.com "Chooses Quadstone—The Smartest Customer Data Mining Solution," (Jul. 31, 2000), Business Wire, 2 pages.
"NCR's Next Generation Software Makes True Customer Relationship Management a Reality," (Jul. 26, 1999) PR Newswire, 3 pages.
"Quadstone System 3.0 Meets New Market Demand for Fast, Easy-to-Use Predictive Analysis for CRM," (May 22, 2000) Business Wire, 3 pages.
"Net Perceptions Alters Dynamics of Marketing Industry with Introduction of Net Perceptions for Call Centers," (Oct. 12, 1998) PR Newswire, 3 pages.
"Ceres Targeted Marketing Application," Ceres Integrated Solutions: retrieved from www.ceresios.com/Product/index.htm (2007) 3 pages.
Prince, C. J., E:business: A Look at the Future, Chief Executive, vol. 154, (Apr. 2000), pp. 10-11.
Oikarinen et al. "Internet Relay Chat Protocol" RFC-1459, pp. 1-65, (May 1993).
eDiet.com: Personalized Diets, Fitness, and Counseling, (May 3, 1998), pp. 1-15.
Fiszer, Max; "Customizing an inbound call-center with skills-based routing," Telemarketing & Call Center Solutions, (Jan. 1997), v15i7 p. 24; Proguest #11267840, 5 pages.
"ESL Federal Credit Union Inaugurates Internet Target Marketing." PR Newswire p. 4210 (Oct. 6, 1998), 3 pages.
"Welcome to eStara—The Industry Leader in Click to Call and Call Tracking Solutions," e-Stara, Inc., retrieved from www.estara.com on Mar. 21, 2013, 1 page.
"Push to Talk Live Now! From your website" iTalkSystem, Inc., retrieved from www.italksystems.com on Mar. 21, 2013, 1 page.
Richardson et al., "Predicting Clicks: Estimating the Click-Through Rate for New Ads," (May 2007) 9 pages.
"Welcome to Keen" retrieved from www.archive.org/web/20010302014355/http://www.keen.com/ on Jan. 25, 2013, 1 page.
Christophe Destruel, Herve Luga, Yves Duthen, Rene Caubet. "Classifiers based system for interface evolution." Expersys Conference, 265-270 (1997), 6 pages.
Ulla de Stricker, Annie Joan Olesen. "Is Management Consulting for You?" Searcher, 48-53 (Mar. 2005), 6 pages.
Humberto T. Marques Neto, Leonardo C.D. Rocha, Pedro H.C. Guerra, Jussara M. Almeida, Wagner Meira Jr., Virgilio A. F. Almeida. "A Characterization of Broadband User Behavior and Their E-Business Activities." ACM SIGMETRICS Performance Evaluation Review, 3-13 (2004), 11 pages.
Greg Bowman, Michael M. Danchak, Mary LaCombe, Don Porter. "Implementing the Rensselaer 80/20 Model in Professional Education." 30th ASEE/IEEE Frontiers in Education Conference, Session T3G (Oct. 18-21, 2000), 1 page.

Elizabeth Sklar Rozier, Richard Alterman. "Participatory Adaptation." CHI, 97, 261-262 (Mar. 22-27, 1997), 2 pages.
Frank White, "The User Interface of Expert Systems: What Recent Research Tells Us." Library Software Review, vol. 13, No. 2, p. 91-98 (Summer 1994) 8 pages.
Frederick W. Rook, Michael L. Donnell. "Human Cognition and the Expert System Interface: Mental Models and Inference Explanations." IEEE Transactions on Systems, Man, and Cybernetics, vol. 23, No. 6, p. 1649-1661 (Nov./Dec. 1993), 13 pages.
Francois Bry et al., "Realizing Business Processes with ECA Rules: Benefits Challenges, Limits" (2006) Principles and Practive of Semantic Web Reasoning Lecture Notes in Computer Science; LNCS Springer Belin DE pp. 48-62 XP019042871, ISBN: 978-3540-39586-7.
International Search Report and Written Opinion for PCT Application No. PCT/US2013/041147, dated Jul. 30, 2013, 9 pages.
International Search Report and Written Opinion for PCT Application No. PCT/US2013/037086, dated Jul. 12, 2013, 9 pages.
International Search Report and Written Opinion for PCT Application No. PCT/US2013/29389, dated Jul. 24, 2013, 8 pages.
International Search Report and Written Opinion for PCT Application No. PCT/US2013/038212, dated Jul. 17, 2013, 11 pages.
International Search Report for PCT Application No. PCT/US03/41090, dated Sep. 1, 2004, 3 pages.
International Search Report for PCT Application No. PCT/US05/40012, dated Oct. 5, 2007, 2 pages.
International Preliminary Report on Patentability for PCT Application No. PCT/US2006/039630, dated Apr. 16, 2008, 4 pages.
International Search Report for PCT Application No. PCT/US2011/031239, dated Jul. 7, 2011, 3 pages.
International Search Report for PCT Application No. PCT/US2011/064946, dated Jun. 22, 2012, 3 pages.
International Preliminary Report on Patentability for PCT Application No. PCT/US2011/031239, dated Oct. 9, 2012, 8 pages.
International Search Report and Written Opinion for PCT Application No. PCT/US14/49822, dated Feb. 27, 2015, 11 pages.
Extended European Search Report dated Jul. 7, 2015 for European Patent Application No. 15161694.3; 8 pages.
International Preliminary Report on Patentability for PCT Application No. PCT/US2014/049822, dated Feb. 18, 2016, 7 pages.
Non-Final Office Action dated Dec. 11, 2008 for U.S. Appl. No. 11/394,078, 15 pages.
Final Office Action dated Jul. 9, 2009 for U.S. Appl. No. 11/394,078, 15 pages.
Non-Final Office Action dated Jan. 28, 2010 for U.S. Appl. No. 11/394,078, 14 pages.
Final Office Action dated Jul. 9, 2010 for U.S. Appl. No. 11/394,078, 16 pages.
Non-Final Office Action dated Feb. 1, 2011 for U.S. Appl. No. 11/394,078, 20 pages.
Final Office Action dated Aug. 2, 2011 for U.S. Appl. No. 11/394,078, 23 pages.
Non-Final Office Action dated May 16, 2012 for U.S. Appl. No. 11/394,078, 23 pages.
Final Office Action dated Jan. 25, 2013 for U.S. Appl. No. 11/394,078, 22 pages.
Non-Final Office Action dated Jun. 22, 2012 for U.S. Appl. No. 13/080,324, 9 pages.
Non-Final Office Action dated Aug. 15, 2012 for U.S. Appl. No. 12/967,782, 31 pages.
Non-Final Office Action dated Jul. 29, 2011 for U.S. Appl. No. 12/608,117, 20 pages.
Final Office Action dated Apr. 4, 2012 for U.S. Appl. No. 12/608,117, 25 pages.
Non-Final Office Action dated Apr. 24, 2004 for U.S. Appl. No. 09/922,753, 16 pages.
Final Office Action dated Oct. 14, 2004 for U.S. Appl. No. 09/922,753, 13 pages.
Non-Final Office Action dated May 17, 2005 for U.S. Appl. No. 09/922,753, 13 pages.
Non-Final Office Action dated Mar. 14, 2006 for U.S. Appl. No. 09/922,753, 13 pages.

(56) References Cited

OTHER PUBLICATIONS

Final Office Action dated Jul. 26, 2006 for U.S. Appl. No. 09/922,753, 13 pages.
Non-Final Office Action dated Aug. 13, 2008 for U.S. Appl. No. 09/922,753, 10 pages.
Final Office Action dated Apr. 23, 2009 for U.S. Appl. No. 09/922,753, 11 pages.
Non-Final Office Action dated Jul. 21, 2009 for U.S. Appl. No. 09/922,753, 10 pages.
Final Office Action dated Feb. 18, 2010 for U.S. Appl. No. 09/922,753, 9 pages.
Non-Final Office Action dated Apr. 25, 2011 for U.S. Appl. No. 09/922,753, 9 pages.
Final Office Action dated Nov. 25, 2011 for U.S. Appl. No. 09/922,753, 10 pages.
Non-Final Office Action dated Aug. 7, 2007 for U.S. Appl. No. 10/980,613, 16 pages.
Non-Final Office Action dated May 15, 2008 for U.S. Appl. No. 10/980,613, 23 pages.
Non-Final Office Action dated Apr. 30, 2012 for U.S. Appl. No. 12/504,265, 16 pages.
Final Office Action dated Aug. 28, 2012 for U.S. Appl. No. 12/504,265, 28 pages.
Final Office Action dated Feb. 14, 2013 for U.S. Appl. No. 13/080,324, 11 pages.
Non-Final Office Action dated Mar. 30, 2013 for U.S. Appl. No. 11/360,530, 23 pages.
Final Office Action dated Apr. 11, 2013 for U.S. Appl. No. 12/967,782, 18 pages.
Non-Final Office Action dated May 10, 2013 for U.S. Appl. No. 13/563,708, 20 pages.
Non-Final Office Action dated Jun. 12, 2013 for U.S. Appl. No. 12/608,117, 56 pages.
Non-Final Office Action dated Jun. 20, 2013 for U.S. Appl. No. 13/157,936, 19 pages.
Non-Final Office Action dated Jun. 27, 2013 for U.S. Appl. No. 12/504,265, 11 pages.
Non-Final Office Action dated Jul. 8, 2013 for U.S. Appl. No. 13/413,197, 10 pages.
Final Office Action dated Oct. 21, 2013 for U.S. Appl. No. 12/504,265 14 pages.
Non-Final Office Action dated Oct. 30, 2013 for U.S. Appl. No. 13/961,072, 10 pages.
Non-Final Office Action dated Dec. 5, 2013 for U.S. Appl. No. 12/967,782, 14 pages.
Non-Final Office Action dated Dec. 4, 2014 for U.S. Appl. No. 14/275,698, 6 pages.
Notice of Allowance dated Jan. 3, 2014 for U.S. Appl. No. 11/360,530, 29 pages.
Final Office Action dated Jan. 22, 2014 for U.S. Appl. No. 12/608,117, 45 pages.
Final Office Action dated Jan. 27, 2014 for U.S. Appl. No. 13/563,708, 35 pages.
Non-Final Office Action dated Jan. 30, 2014 for U.S. Appl. No. 13/413,158, 19 pages.
Notice of Allowance dated Feb. 12, 2014 for U.S. Appl. No. 13/157,936, 33 pages.
Final Office Action dated Feb. 19, 2014 for U.S. Appl. No. 13/961,072, 35 pages.
Non-Final Office Action dated Feb. 20, 2014 for U.S. Appl. No. 10/980,613, 43 pages.
Notice of Allowance dated Feb. 28, 2014 for U.S. Appl. No. 09/922,753, 13 pages.
Notice of Allowance dated Mar. 25, 2014 for U.S. Appl. No. 12/504,265 31 pages.
Notice of Allowance dated Mar. 31, 2014 for U.S. Appl. No. 12/725,999, 41 pages.
Notice of Allowance dated Mar. 30, 2015 for U.S. Appl. No. 14/275,698, 11 pages.
Notice of Allowance dated Apr. 1, 2014 for U.S. Appl. No. 13/413,197, 32 pages.
Non-Final Office Action dated Jul. 17, 2014 for U.S. Appl. No. 11/394,078, 41 pages.
Non-Final Office Action dated Jul. 31, 2014 for U.S. Appl. No. 13/080,324, 38 pages.
Notice of Allowance dated Aug. 18, 2014 for U.S. Appl. No. 12/967,782, 43 pages.
Non-Final Office Action dated Aug. 21, 2014 for U.S. Appl. No. 10/980,613, 43 pages.
Final Office Action dated Mar. 12, 2015 for U.S. Appl. No. 13/080,324, 13 pages.
Non-Final Office Action dated Mar. 13, 2015 for U.S. Appl. No. 13/841,434, 26 pages.
Non-Final Office Action dated Apr. 9, 2015 for U.S. Appl. No. 13/830,719, 24 pages.
Final Office Action dated Apr. 7, 2015 for U.S. Appl. No. 11/394,078, 18 pages.
Non-Final Office Action dated Apr. 6, 2015 for U.S. Appl. No. 14/322,736, 13 pages.
Non-Final Office Action dated May 7, 2015 for U.S. Appl. No. 13/829,708, 16 pages.
Final Office Action dated May 8, 2015 for U.S. Appl. No. 10/980,613, 18 pages.
Non-Final Office Action dated May 13, 2015 for U.S. Appl. No. 14/317,346, 21 pages.
Non-Final Office Acton dated Jun. 2, 2015 for U.S. Appl. No. 12/608,117, 26 pages.
First Action Pre-Interview Communication dated Jun. 19, 2015 for U.S. Appl. No. 14/244,830, 7 pages.
Non-Final Office Action dated Jul. 20, 2015 for U.S. Appl. No. 14/711,609; 12 pages.
Non-Final Office Action dated Jul. 20, 2015 for U.S. Appl. No. 14/500,537; 12 pages.
Final Office Action dated Jul. 31, 2015 for U.S. Appl. No. 14/317,346, 13 pages.
Final Office Action dated Aug. 10, 2015 for U.S. Appl. No. 13/961,072, 12 pages.
Non-Final Office Action dated Aug. 14, 2015 for U.S. Appl. No. 14/543,397, 12 pages.
Non-Final Office Action dated Aug. 18, 2015 for U.S. Appl. No. 14/570,963, 23 pages.
Non-Final Office Action dated Aug. 27, 2015 for U.S. Appl. No. 11/394,078, 21 pages.
Non-Final Office Action dated Sep. 11, 2015 for U.S. Appl. No. 14/500,502; 12 pages.
Final Office Action dated Sep. 18, 2015 for U.S. Appl. No. 14/288,258, 17 pages.
Notice of Allowance dated Sep. 18, 2015 for U.S. Appl. No. 14/244,830, 11 pages.
First Action Interview Pilot Program Pre-Interview Communication dated Oct. 21, 2015 for U.S. Appl. No. 14/313,511, 3 pages.
Final Office Action dated Oct. 22, 2015 for U.S. Appl. No. 13/830,719, 29 pages.
Final Office Action dated Nov. 10, 2015 for U.S. Appl. No. 13/841,434; 30 pages.
Final Office Acton dated Nov. 17, 2015 for U.S. Appl. No. 12/608,117, 32 pages.
Non-Final Office Action dated Dec. 4, 2015 for U.S. Appl. No. 10/980,613 21 pages.
Non-Final Office Action dated Dec. 24, 2015 for U.S. Appl. No. 14/317,346, 15 pages.
Notice of Allowance dated Dec. 30, 2015 for U.S. Appl. No. 14/322,736, 9 pages.
Non-Final Office Action dated Jan. 5, 2016 for U.S. Appl. No. 14/245,400, 33 pages.
Notice of Allowance dated Jan. 7, 2016 for U.S. Appl. No. 14/313,511, 5 pages.
First Action Pre-Interview Communication dated Jan. 12, 2016 for U.S. Appl. No. 14/753,496, 3 pages.
Notice of Allowance dated Jan. 20, 2016 for U.S. Appl. No. 13/829,708, 11 pages.

(56) References Cited

OTHER PUBLICATIONS

Final Office Action dated Jan. 29, 2016 for U.S. Appl. No. 14/711,609; 15 pages.
Final Office Action dated Jan. 29, 2016 for U.S. Appl. No. 14/500,537; 15 pages.
Non-Final Office Action dated Feb. 12, 2016 for U.S. Appl. No. 13/080,324, 15 pages.
Notice of Allowance dated Mar. 16, 2016 for U.S. Appl. No. 14/582,550; 9 pages.
Notice of Allowance dated Mar. 21, 2016 for U.S. Appl. No. 14/753,496; 5 pages.
Final Office Action dated Apr. 14, 2016 for U.S. Appl. No. 10/980,613, 21 pages.
Final Office Action dated Apr. 21, 2016 for U.S. Appl. No. 14/317,346, 17 pages.
Non-Final Office Action dated Apr. 22, 2016 for U.S. Appl. No. 14/288,258 11 pages.
Notice of Allowance dated Apr. 22, 2016 for U.S. Appl. No. 11/394,078, 16 pages.
Non-Final Office Action dated May 12, 2016 for U.S. Appl. No. 13/961,072, 12 pages.
Non-Final Office Acton dated May 23, 2016 for U.S. Appl. No. 12/608,117, 35 pages.
Final Office Action dated Jun. 9, 2016 for U.S. Appl. No. 14/543,397, 18 pages.
Final Office Action dated Jun. 17, 2016 for U.S. Appl. No. 14/570,963, 18 pages.
Notice of Allowance dated Jun. 23, 2016 for U.S. Appl. No. 13/830,719; 26 pages.
Final Office Action dated Jun. 28, 2016 for U.S. Appl. No. 14/500,502, 10 pages.
Final Office Action dated Jul. 12, 2016 for U.S. Appl. No. 14/245,400, 36 pages.
First Action Pre-Interview Communication dated Jul. 14, 2016 for U.S. Appl. No. 14/970,225.
Final Office Action dated Sep. 8, 2016 for U.S. Appl. No. 13/080,324, 15 pages.
Notice of Allowance dated Sep. 21, 2016 for U.S. Appl. No. 14/711,609, 22 pages.
Notice of Allowance dated Sep. 22, 2016 for U.S. Appl. No. 14/500,537, 19 pages.
Notice of Allowance dated Sep. 23, 2016 for U.S. Appl. No. 13/841,434, 15 pages.
Notice of Allowance dated Sep. 30, 2016 for U.S. Appl. No. 14/317,346, 19 pages.
Notice of Allowance dated Oct. 7, 2016 for U.S. Appl. No. 14/288,258, 10 pages.
Non-Final Office Action dated Jan. 13, 2017 for U.S. Appl. No. 14/543,397, 19 pages.
Non-Final Office Action dated Jan. 9, 2017 for U.S. Appl. No. 14/570,963, 16 pages.
Notice of Allowance dated Jan. 13, 2017 for U.S. Appl. No. 15/294,441, 10 pages.
Pre-Interview First Office Action dated Apr. 3, 2017 for U.S. Appl. No. 15/384,895, 7 pages.
Non-Final Office Action dated Mar. 27, 2017 for U.S. Appl. No. 14/245,400; 43 pages.
Notice of Allowance dated May 22, 2017 for U.S. Appl. No. 13/080,324; 10 pages.
Non-Final Office Action dated Jul. 17, 2017 for U.S. Appl. No. 15/131,777; 11 pages.
Non-Final Office Action dated Sep. 7, 2017 for U.S. Appl. No. 15/273,863, 29 pages.
Non-Final Office Action dated Sep. 25 2017 for U.S. Appl. No. 15/632,069, 12 pages.

\* cited by examiner nuconomy STUDIO
Powering the Next Generation Economy

The current data was last updated on: October 22, 2008, 08:00 AM GMT-2:00

Customer: nuconomy
Project: Demo

Hello noa   Invite user   Logout

| Home | Insights | Community | Content | Marketing | Activities | Ordering | Administration | Help |

Ordering Center Home
Create New Process

Ordering Dashboard   848                                852

| | Process Name | Locked | Last Update |
|---|---|---|---|
| Delete, Edit, View | Startup Phase | ☑ | 09/04/2006 09:10:09 PM |
| Delete, Edit, View | Going For Quality | | 07/15/2008 04:27:55 PM |
| Delete, Edit, View | Start Phase | | 03/17/2008 12:21:34 PM |
| Delete, Edit, View | haggai | | 01/12/2008 04:33:20 AM |
| Delete, Edit, View | Generated process -- 09-10-2007 | | 05/27/2008 10:48:04 AM |
| Delete, Edit, View | Generated process -- 09-10-2007 | | 09/10/2007 12:17:19 PM |
| Delete, Edit, View | Generated process -- 09-13-2007 | | 09/13/2007 04:58:26 AM |
| Delete, Edit, View | Generated process -- 09-17-2007 | | 09/17/2007 12:02:31 PM |
| Delete, Edit, View | Generated process -- 10-09-2007 | | 10/09/2007 11:16:14 AM |
| Delete, Edit, View | Generated process -- 11-08-2007 | | 11/08/2007 07:10:50 AM |
| Delete, Edit, View | Generated process -- 11-08-2007 | | 11/08/2007 07:10:56 AM |
| Delete, Edit, View | Generated process -- 11-08-2007 | | 11/08/2007 07:11:01 AM |

| © 2007-2008 NuConomy | Terms and Conditions | Privacy Policy | Contact us

FIG. 8d

| | Add to Favorites | Average Rating | Brand View | Category View | Comments | Logins | Main Category View | Page Views | Object Bid | Object Cube Click | Object Request | Object Register |
|---|---|---|---|---|---|---|---|---|---|---|---|---|
| Add to Favorites | 1.00 | -0.25 | 0.69 | 0.25 | -0.07 | 0.39 | 0.27 | 0.35 | 0.24 | 0.29 | 0.57 | 0.36 |
| Rating | 0.25 | 1.00 | -0.69 | -0.84 | 0.51 | -0.73 | -0.82 | -0.79 | -0.79 | -0.80 | -0.84 | -0.75 |
| Brand View | 0.69 | -0.69 | 1.00 | 0.78 | -0.14 | 0.89 | 0.80 | 0.88 | 0.81 | 0.82 | 0.95 | 0.89 |
| View | 0.25 | -0.84 | 0.78 | 1.00 | -0.12 | 0.91 | 0.99 | 0.96 | 0.93 | 0.98 | 0.88 | 0.92 |
| Comments | -0.07 | 0.51 | -0.14 | -0.12 | 1.00 | -0.11 | -0.05 | 0.00 | -0.17 | -0.10 | -0.18 | -0.14 |
| Logins | 0.39 | -0.73 | 0.89 | 0.91 | -0.11 | 1.00 | 0.91 | 0.95 | 0.98 | 0.97 | 0.97 | 1.00 |
| Main | 0.27 | -0.82 | 0.80 | 0.99 | -0.05 | 0.91 | 1.00 | 0.98 | 0.93 | 0.97 | 0.88 | 0.92 |

FIG. 9a

Report for: Wednesday, August 27, 2008 — 2104

Yesterday, users who performed Posted Video and had Background Color 'Red' performed 5 more vents than the past week's daily average.

Yesterday, users who performed Posted Photo and came from the United States performed 4 more events than the past week's daily average.

Yesterday, users who performed Posts and had Background Color 'Blue' performed 5 more events than the past week's daily average.

Yesterday, users who performed Entered chat and had Background Color 'Blue' performed 2 more events than the past week's daily average.

Yesterday, users who performed Video Play Time and had Background Color 'Green' performed 3 more events than the past week's daily average.

Over the last week, users who performed Purchases and had Background Color 'Red' performed more events, at a rate of about 1 a day.

Over the last week, users who performed Creator Send To Friend and had Background Color 'Green' performed more events, at a rate of about 1 a day.

Over the last week, users who performed Video Play Time and had Background Color 'Blue' performed more events, at a rate of about 1 a day.

SYSTEM AND METHOD FOR APPLYING TRACING TOOLS FOR NETWORK LOCATIONS

CROSS-REFERENCE TO RELATED APPLICATIONS

This application is a continuation-in-part of U.S. patent application Ser. No. 12/608,117 filed on Oct. 29, 2009, which claims priority under 35 U.S.C. §119(e) to U.S. Provisional Application No. 61/109,192 filed on Oct. 29, 2008. The disclosures of each of the foregoing patent applications is incorporated herein by reference in their entirety for all purposes.

FIELD OF THE INVENTION

The present invention relates generally to network location tracing, and more particularly to a system and method for applying an analytical processing to network locations.

BACKGROUND

There are several methods of gathering analytics on client devices (e.g. users) connected to network locations (e.g. websites). One method uses the traffic history contained in the server's log files. Server log files were not intended for monitoring network location traffic, although they can be used for this purpose. However, the process of extracting the data from a busy server, collating it and presenting is pretty slow and messy. Other systems make use of bits of HTML code added to the network locations. These bits of code extract data from a client device connected to a network location and send it to a database on either the host's server of the network location or a proprietary server. It would be advantageous to provide means to go beyond traditional tracing (e.g. metrics), such as the page view, and instead provide structured measures of interaction.

SUMMARY OF THE INVENTION

Accordingly, it is a principal object of the present invention to extend traditional network location based tracing such as page views and instead provide measurements of interaction.

It is one more principal object of the present invention to provide to network devices that connect to a network location an individualized user interface. A network location may present a first network device with a first type of content while presenting a second network device with a second type of content. As the present invention traces the network device, the system determines the preference of each network device connected to the network location and provides a unique user interface of the network location to each network device.

It is a further principal object of the present invention to enable network locations to measure network device activities and interactions with more accuracy and depth.

It is another principal object of the present invention to provide a way to measure, interpret and grow content, community, and the output from a given input.

It is one other principal object of the present invention to enable network locations to determine how network device's interact with the aspects of the network location.

It is yet a further principal object of the present invention to provide network locations with real-time warnings on network device performance, trends, and abnormalities which are accompanied by actionable solutions.

A method is disclosed for enabling a network location to provide an ordering process for data relevant to connected network devices' activities. The method includes assembling the data, utilizing (e.g. monetizing) the activity data, and associating the data, such that information is derived to enable a desired expansion of at least one designated activity. Utilizing the activity data also involves having a network location designate a unit of measure, such as unit of time (the duration of which the network device executes a particular activity). Another method is disclosed for managing an object assignment broadcast (e.g. ad) operation for a network location based a network device's previous activities. This second method includes tracing a network device's conduct to determine that a network device prefers a particular class of content. The method also includes tagging a network device's profile with the respective observation and deciding by a network location as to the classification factor for a network device to be targeted for an object assignment broadcast. Finally, the most relevant object assignment broadcasts are displayed at each network device according to the network device's profile and continuing network location activity.

The present invention provides a warning system that traces the conduct of network devices connected to a network location, detects trends and abnormalities and identifies deviations in network device activity. The application provides actionable reports, thus enables network locations to improve network device conversion and output from a given input, expand network device immersion, and expand network device connection time to the network location, etc.

Network locations receive real-time information connected devices regarding: the network location's current operating status; the network devices' top contributing content generators; the network devices that are the top contributing network devices; identifying target network devices; identifying the top contributing content; the network devices that may disconnect from the network location (e.g. network device loss); and/or exact output from a given input generated by each operation and device attributor.

Some of the unique features of the present invention are: measures the network device immersion and input parameters; detect the exact input of every element of network location content; traces network device data; obtain real-time warnings on deviations in network device conduct.

The present invention provides a full two-way Application Programmer Interface (API). An API is a set of public methods accessible to network locations. In non-Java situations, API refers to the visible part of the code in a software package. Network locations can enhance network device immersion using device based individualization and a suggestion engine. Network locations can also develop impetuses. Object assignment broadcast networks integrate with the API to serve different object assignment broadcasts to specific network devices based on information regarding that network device. Network locations are dynamically programmed using the API, down to the network device level, based on information associated with specific content that target specific network devices. Network-based object assignment platforms dynamically create specific assignments and target specific objects to specific network devices based on network device conduct.

The present invention provides two basic tools:

I Tracing Tool

Traces network locations and provides information on connected network device activity.

Which objects should be targeted?

Which search identifiers should be targeted?

Each network device can get a unique display of the network location, given enough information.

Which network devices should be targeted?

If one knows the utilization one can determine value of each network device.

By running the ordering process, one can give recommendations for any dimension:

network devices, objects, search identifiers, and/or location.

Network devices need not install or download anything.

II The Sage Engine: Proactive Tracing

The tool (tradename "Sage") traces a network location's data to derive conclusions in the form of trends and/or spikes in activity or other "stories." For example, network devices connected to a network location from a particular location may vary over a time interval by about 3-4%, but over a specific time interval the system detected an increase of 15%. In another example, there was a steady increase of 34% of network devices searching for recreational destinations.

In another example, on a network location with a "request for network device object selection" (e.g. bidding or simply "selection") format, a particular object was found to generate a disproportionately large amount of selections and reviews. The system orients the object within the home page of the network location after which object assignments over a particular interval for the object increased by at least one order of magnitude.

The network location for the present invention may associate with other network locations or associate with a terminal device of network locations. The network location for the present invention traces data from a selection-based network location and, as a result, may make recommendations based on network device's conduct toward one object such as the iPhone to another object such as Nokia. The network location may transmit a message to a network device indicating that "many network devices that assigned an iPhone also assigned a Nokia phone."

Such results are used to initiate and/or reformulate ads presented to network devices based on the network devices' previous activities, according the following exemplary procedure: tracing a network device's conduct results in observations that a network device prefers a class of objects; tagging the network devices profile with the respective property; deciding by the network location as to the classification factor to be targeted for an ad, for example, if the network location is assigning an object the Sage engine finds network devices that may require the object (see "Top Engaging Tags," with reference to FIG. 2 below); and displaying the most relevant ads to each network device.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

The present disclosure is described in conjunction with the appended figures:

FIG. 8d is a screenshot of a preferred embodiment of a network location showing the "Ordering Dashboard" on the Ordering Center HomePage, constructed according to the principles of the present invention;

FIG. 9a is a screenshot of the Activity Correlation Map, constructed according to the principles of the present invention;

FIG. 12 is a screenshot illustrating the analyses of the SAGE engine reports, constructed according to the principles of the present invention.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides examples of embodiment(s) only and is not intended to limit the scope, applicability or configuration of the disclosure. Rather, the ensuing description of the examples of embodiment(s) will provide those skilled in the art with an enabling description for implementing examples of embodiment. It is understood that various changes can be made in the function and arrangement of elements without departing from the spirit and scope as set forth in the appended claims.

Figure 1:
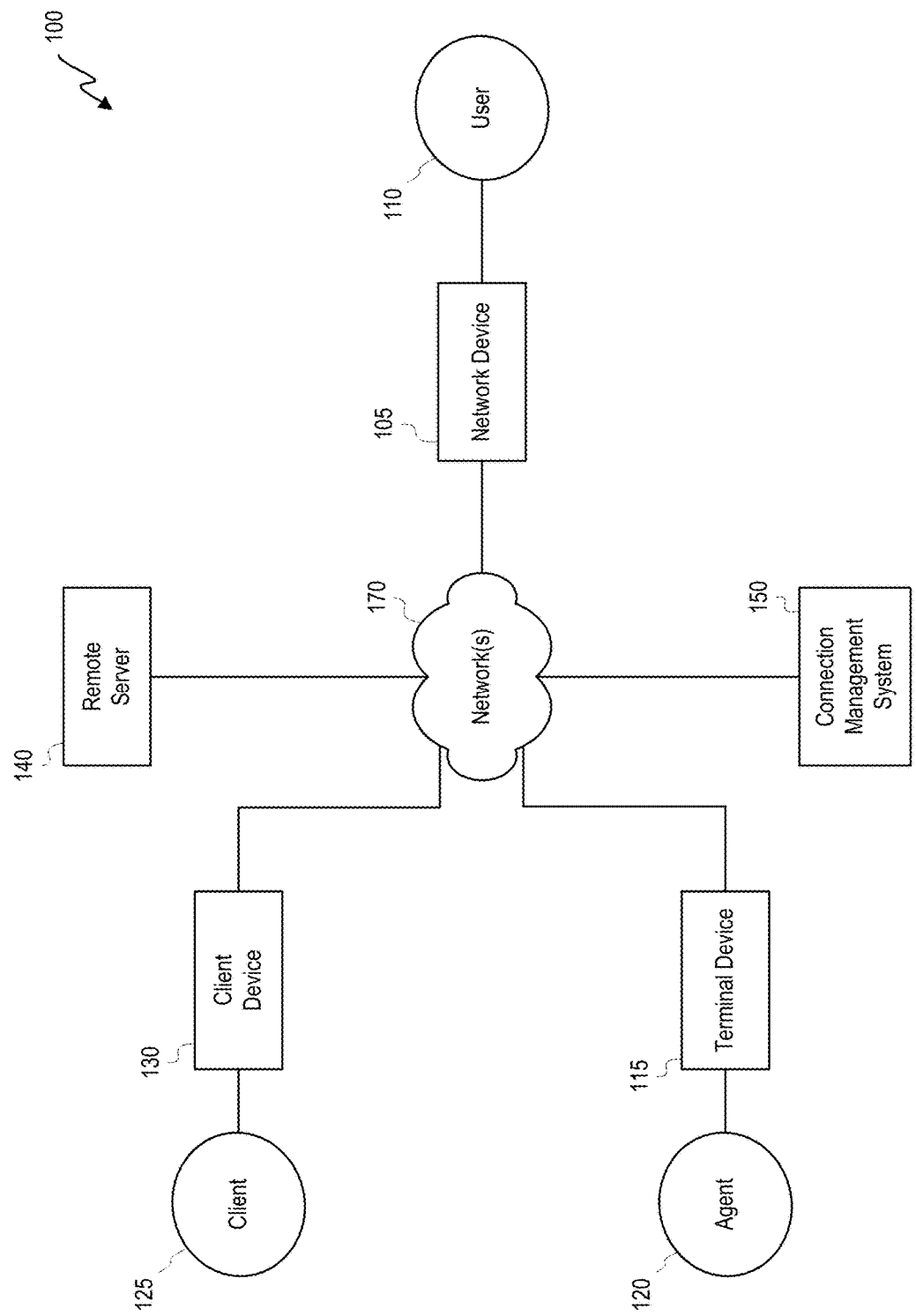
FIG. 1 shows a block diagram of an embodiment of a network interaction system.

FIG. 1 shows a block diagram of an embodiment of a network interaction system 100 which implements and supports certain embodiments and features described herein. Certain embodiments relate to establishing a connection channel between a network device 105 (which can be operated by a user 110) and a terminal device 115 (which can be operated by an agent 120). In certain embodiments, the network interaction system 100 can include a client device 130 associated with a client 125.

In certain embodiments, a user 110 can access remote server 140 to interact with an interface. A client 125 can be an entity that provides, operates, or runs the network site, or agents employed by or assigned by such an entity to perform the tasks available to a client 125 as described herein. The agent 120 can be a person, such as a support agent tasked with providing support or data to the user 110 regarding the network site (e.g., data about objects available for assignment over a network). Out of a large number of agents, a subset of agents may be appropriate for providing support or data for a particular client 125. The agent 120 may be affiliated or not affiliated with the client 125. Each agent can be associated with one or more clients 125. In some non-limiting examples, a user 110 can access a network site using a user device (e.g., a smartphone, an electronic computing device, an electronic computing device, and other suitable computing devices), a client 125 can be a company that provides objects to be assigned to users that meet certain conditions (e.g., pays a specific price), and an agent 120 can be an agent that is associated with the company. In various embodiments, the user 110, client 125, and agent 120 can be other users or entities.

While FIG. 1 shows only a single network device 105, terminal device 115 and client device 130, an interaction system 100 can include multiple or many (e.g., tens, hundreds or thousands) of each of one or more of these types of devices. Similarly, while FIG. 1 shows only a single user 110, agent 120 and client 125, an interaction system 100 can include multiple or many of each of one or more of such entities. Thus, it may be necessary to determine which terminal device is to be selected to communicate with a particular network device. Further complicating matters, a remote server 140 may also be configured to receive and respond to select network-device communications.

A connection management system 150 can facilitate strategic routing of communications. A communication can include a message with content (e.g., defined based on input from an entity, such as typed or spoken input). The communication can also include additional data, such as data about a transmitting device (e.g., an IP address, user identifier, device type and/or operating system); a destination address; an identifier of a client; an identifier of an interface or interface element (e.g., a network site or network site element being visited when the communication was generated or otherwise associated with the communication); a time (e.g., time of day); and/or destination address. Other data can be included in the communication. In some instances, connection management system 150 routes the entire communication to another device. In some instances, connection management system 150 modifies the communication or generates a new communication (e.g., based on the initial communication). The new or modified communication can include the message (or processed version thereof), at least some (or all) of the additional data (e.g., about the transmitting device, network interface and/or time) and/or other data identified by connection management system 150 (e.g., user data associated with a particular user identifier or device). The new or modified communication can include other data as well.

Part of strategic-routing facilitation can include establishing, updating and using one or more connection channels between network device 105 and one or more terminal devices 115. For example, upon receiving a communication from network device 105, connection management system 150 can first estimate to which client (if any) the communication corresponds. Upon identifying a client, connection management system 150 can identify a terminal device 115 associated with the client for communication with network device 105. In some instances, the identification can include evaluating a protocol (e.g., profile) of each of a plurality of agents, each agent (e.g., agent 120) in the plurality of agents being associated with a terminal device (e.g., terminal device 115). The evaluation can relate to a content in a network-device message. The identification of the terminal device 115 can include a technique described, for example, in U.S. application Ser. No. 12/725,799, filed on Mar. 17, 2010, which is hereby incorporated by reference in its entirety for all purposes.

In some instances, connection management system 150 can determine whether any connection channels are established between network device 105 and a terminal device associated with the client (or remote server 140) and, if so, whether such channel is to be used to transmit and receive a series of communications including the communication or message. This determination may depend, at least in part, on a topic associated with the communication, a polarity parameter (e.g., a sentiment score or value) associated with the communication or a past related communication, an estimated response latency for terminal device 115 and/or a type of communication channel associated with the communication (e.g., instant message, message, email, phone). Selecting an established communication channel may reduce the need to relay data from network device 105 multiple times. Meanwhile, determining that a new communication channel is to be established can facilitate quicker responses from more specialized agents.

A decision as to whether to select (or continue to use) an established communication channel and/or a selection of a new terminal device can include determining an extent to which each of one or more terminal devices (e.g., associated with a client) corresponds to a communication and/or an associated the user. Such correspondence can relate to, for example, an extent to which an agent's resource set (e.g., knowledge base) corresponds to a communication topic, an availability of an agent at a particular time and/or over a channel type, a language similarity between a user and agent.

Connection management system 150 may use communication analyses to influence routing determinations (e.g., determining whether to route a communication to a terminal device having previously received a communication from a network device having transmitted the communication or selecting a terminal device to receive or transmit a communication). One communication analysis can include determining one or more types or tags of a current or past communication or communication series. For example, a communication can be assigned a type for each of (for example) a topic, channel type (e.g., email, SMS message, real-time chat, phone call or asynchronous message), complexity level, message polarity, and/or whether/which file type is attached, and a terminal-device selection can be biased towards terminal devices associated with similar or related types.

Upon selecting a terminal device 115 to communicate with network device 105, connection management system 150 can establish a connection channel between the network device 105 and terminal device 115. In some instances, connection management system 150 can transmit a message to the selected terminal device 115. The message may request that the terminal device approve a proposed assignment to communicate with a network device 105 or identify that such an assignment has been generated. The message can include data about network device 105 (e.g., IP address, device type, and/or operating system), data about an associated user 110 (e.g., language spoken, duration of having interacted with client, skill level, and/or topic preferences), a received communication, code (e.g., a clickable hyperlink) for generating and transmitting a communication to the network device 105, and/or an instruction to generate and transmit a communication to network device 105.

In one instance, communications between network device 105 and terminal device 115 can be routed through connection management system 150. Such a configuration can allow connection management system 150 to monitor the transmitting and/or receiving of communications or messages and to detect issues (e.g., as defined based on rules) such as non-responsiveness of either device or extended latency. Further, such a configuration can facilitate selective or complete storage of communications, which may later be used, for example, to determine a quality of a communications between network devices and terminal devices and/or to support learning to update or generate routing rules so as to determine particular post-communication targets. Such storage can also facilitate generation of a series of previous messages (e.g., a message history) between a network device and first terminal device, which may be transmitted (for example) to a second terminal device when it is determined that the second terminal device is to join an existing or participate in a new communication series with the network device.

In some embodiments, connection management system 150 can monitor the transmitting and receiving of communications in real-time and perform automated actions (e.g., rule-based actions) based on the live communications. For example, when connection management system 150 determines that a communication relates to a particular object, connection management system 150 can automatically transmit an additional message to terminal device 115 containing additional data about the object (e.g., quantity of objects available, other data about the similar objects, etc.).

In one instance, a designated terminal device 115 can communicate with network device 105 without relaying communications through connection management system 150. One or both devices 105, 115 may (or may not) report particular communication metrics or content to connection management system 150 to facilitate communication monitoring and/or data storage.

As mentioned, connection management system 150 may route select communications to a remote server 140. Remote server 140 can be configured to provide data in a predetermined manner. For example, remote server 140 may access defined one or more text passages, voice recording and/or files to transmit in response to a communication. Remote server 140 may select a particular text passage, recording or file based on, for example, an analysis of a received communication (e.g., a semantic or mapping analysis).

Routing and/or other determinations or processing performed at connection management system 150 can be performed based on rules and/or data at least partly defined by or provided by one or more client devices 130. For example, client device 130 may transmit a communication that identifies a prioritization of agents, terminal-device types, and/or topic similarity. As another example, client device 130 may identify one or more weights to apply to various variables that may impact routing determinations (e.g., estimated response time, device type and capabilities, and/or terminal-device load balancing). It will be appreciated that which terminal devices and/or agents are to be associated with a client may be dynamic. Communications from client device 130 and/or terminal devices 115 may provide data indicating that a particular terminal device and/or agent is to be added or removed as one associated with a client. For example, client device 130 can transmit a communication with IP address and an indication as to whether a terminal device with the address is to be added or removed from a list identifying client-associated terminal devices.

In one instance, connection management system 150 facilitates an initial connection and routing between network device 105 and a first terminal device 115. For example, a message received in a communication from network device 105 can be routed to the first terminal device. As another example, communication management system 150 can transmit a communication to the first terminal device that includes or is indicative of a request or instruction to transmit a communication (e.g., initiating a communication series) to network device 105.

Connection management system 150 can monitor and/or analyze a corresponding communication series between network device 105 and the first terminal device to determine a characteristic. For example, connection management system 150 can analyze message content in one or more communications (e.g., to determine whether and/or how many of particular words, symbols or character types, such as "frustrat*", "very", "thank", or "irritat*", "!" or capital letters, were used). As another example, connection management system 150 can determine one or more statistics relating to each of one or more messages and/or the series. Examples of statistics can include, for example, message length (e.g., in words or characters), latency between a receipt of a communication and transmission of a responsive communication, latency between subsequent message transmissions, or typing speed while typing a message. As yet another example, connection management system 150 can receive and process one or more inputs, detected initially at network device 105 or the first terminal device and then identified to connection management system 150. Such inputs can identify, for example, a reroute request, or a resolution stage.

Connection management system 150 can evaluate the characteristic (e.g., characterizing message content, including a statistic or characterizing an input) to determine whether to define subsequent routing rules in a particular manner. For example, a continuous-channel rule can include a condition relating to a characteristic that specifies when routing of network-device messages is to be inclined towards the first terminal device (which previously communicated with the network device). The rule can be configured such that satisfaction of the condition results in establishment of a continuous channel between the network device and the first terminal device. The continuous channel can allow subsequent messages from the network device to be automatically routed to the first terminal device and/or preferentially routed to the first terminal device. The continuous channel can be configured to persist through multiple communication series. For example, even if a first series of messages are communicated between the network device and first terminal device on a first day, the channel can inclination routing of another message from the network device transmitted on a second day to be routed to the same first terminal device. A magnitude of such inclination may depend on, for example, a time since a previous interaction between the network device and first terminal device (e.g., increasing the level of inclination when a past interaction was recent), a total duration of and/or number of communications in a previous conversation (e.g., series of messages communicated between the network device and first terminal device) and/or a number of previous messages communicated between the network device and first terminal device (and/or a cumulative interaction time or count of messages).

Upon establishing a continuous channel, connection management system 150 can further facilitate presenting a presentation (e.g., notification) at network device 105 so as to alert user 110 that a continuous channel has been established, to identify the first terminal device or associated user and/or to indicate that subsequent messages (e.g., transmitted in association with an identifier of the channel, associated with a particular client, etc.) are to be routed to or to have routing inclined towards the first terminal device.

Conversely, connection management system 150 may determine that the characteristic indicates that subsequent messages from network device 105 (e.g., relating to a client) are not to be routed to the same first terminal device and/or are to be rerouted. For example, it can be determined that the condition in the continuous-channel rule is not satisfied. Upon such a determination, connection management system 150 can identify a new terminal device to route communications (e.g., relating to a client) to from the network device.

In one instance, a continuous-channel rule is configured such that a continuous channel is to be established between a network device and a terminal device following an initial routing of a communication between the two devices. Thus, the continuous channel may serve to facilitate consistent message routing within a single conversation (e.g., series of communicated messages). In an alternative or same instance, a continuous-channel rule may (also or alternatively) be configured such that a continuous channel is established, maintained or used so as to execute consistent message routing across different message series (e.g., the series being separated in time). Depending on the embodiment, a continuous-channel rule may limit a number of continuous channels that can be provided with respect to a network device and/or client. For example, a rule may indicate that, for a network device and client, the network device can only be connected to one (or three or another specified number) terminal devices via continuous channel.

In some instances, connection management system 150 can determine that a re-routing process is to be initiated (e.g., based on satisfaction of a condition in a re-routing rule). The determination can be based on a characteristic (e.g., characterizing message content, including a statistic or characterizing an input). For example, a re-routing rule can be configured such that re-routing is to be initiated upon detecting a characteristic indicative of user frustration or dissatisfaction; detecting a characteristic indicative of a lack of progress towards a resolution of an issue; detecting impermissible terminal-device communication statistics (e.g., long response latencies); or detecting that messages are beginning to focus on a new topic.

A re-routing process can include identifying a different terminal device to participate in a communication session with network device 105. Such an identification can be based on, for example, a topic associated with the communication, a polarity parameter associated with the communication or a past related communication, an estimated response latency for terminal device 115, a type of communication channel associated with the communication (e.g., instant message, message, email, phone), a type of each of one or more other terminal devices, a capability of one or more other terminal devices, and the like. A selection of the different terminal device may be performed in a same, similar or different manner as compared to a selection of a first terminal device. For example, determining that a re-routing rule's condition has been satisfied may incline a subsequent terminal-device selection towards higher-ordering devices.

A re-routing process may include transmitting a notification identifying a proposed re-routing to one or more devices, such as network device 105, the first terminal device or the different terminal device. The notification may include an option to authorize and/or an option reject the proposed re-routing. The notification may include data about network device 105, the first terminal device and/or the different terminal device and/or an associated party.

To reduce an abrupt transition between terminal devices, connection management system 150 can coordinate an overlap time period. During this time period, each of the first terminal device and the different terminal device can receive one or more communications (or processed versions thereof) from network device 105. For example, a new communication from network device 105 can be duplicated and then routed to each of the first and different terminal device.

In some instances, connection management system 150 can generate a dynamic message chronicle that includes multiple messages from network device 105 and/or from the first terminal device. The chronicle can include, for example, all messages in a communication session, all messages routed within a defined time period (e.g., previous 3 minutes), or all messages associated with one or more defined tags or types. For example, messages relating to a particular topic, message polarity (e.g., corresponding to dissatisfaction), or content type (e.g., including a question) can be selected. Connection management system 150 can transmit the dynamic message chronicle to the different terminal device. New messages from network device 105 and/or the first terminal device can further be transmitted to the different terminal device, such that the dynamic message chronicle can be appended with such new messages. Message selection for a dynamic message chronicle and/or whether a dynamic message chronicle is to be provided may also depend on whether re-routing is to occur during a temporally clustered series of messages or between message series.

In some instances, connection management system 150 can determine whether and/or when to stop routing communications to the first terminal device. For example, such routing termination may be performed upon detecting a response communication from the different terminal device, after a defined time period has elapsed following transmission of the message chronicle, after detecting an input received at the first terminal device indicating an intent to terminate a communication session, after detecting an input received at the different terminal device indicating an intent to handle a communication session, after detecting an input received at network device 105 requesting the proposed re-routing to the different terminal device be executed, and so on.

Depending on a rule or a reason for initiating a re-routing transfer, the re-routing may include closing a connection channel between network device 105 and the first terminal device (e.g., if a re-routing process was initiated in response to a low user polarity) and/or establishing a new connection channel between network device 105 and the different terminal device.

Each communication (e.g., between devices, between a device and connection management system 150, between remote server 140 and connection management system 150 or between remote server 140 and a device) can occur over one or more networks 170. Any combination of open or closed networks can be included in the one or more networks 170. Examples of suitable networks include the Internet, a personal area network, a local area network (LAN), a wide area network (WAN), or a wireless local area network (WLAN). Other networks may be suitable as well. The one or more networks 170 can be incorporated entirely within or can include an intranet, an extranet, or a combination thereof. In some instances, a network in the one or more networks 170 includes a short-range communication channel, such as a Bluetooth or a Bluetooth Low Energy channel. In one embodiment, communications between two or more systems and/or devices can be achieved by a secure communications protocol, such as secure sockets layer (SSL) or transport layer security (TLS). In addition, data may be encrypted based on any convenient, known, or to be developed manner, such as, but not limited to, Data Encryption Standard (DES), Triple DES, Rivest-Shamir-Adleman encryption (RSA), Blowfish encryption, Advanced Encryption Standard (AES), CAST-128, CAST-256, Decorrelated Fast Cipher (DFC), Tiny Encryption Algorithm (TEA), eXtended TEA (XTEA), Corrected Block TEA (XXTEA), and/or RC5, etc.

A network device 105, terminal device 115 and/or client device 130 can include, for example, a portable electronic device (e.g., a smart phone, tablet, laptop computer, or smart wearable device) or a non-portable electronic device (e.g., one or more desktop computers, smart appliances, servers, and/or processors). Connection management system 150 can be separately housed from network, terminal and client devices or may be part of one or more such devices (e.g., via installation of an application on a device). Remote server 140 may be separately housed from each device and connection management system 150 and/or may be part of another device or system. While each device, server and system in FIG. 1 is shown as a single device, it will be appreciated that multiple devices may instead be used. For example, a set of network devices can be used to transmit various communications from a single user, or remote server 140 may include a server stack.

A software agent or application may be installed on and/or executable on a depicted device, system or server. In one instance, the software agent or application is configured such that various depicted elements can act in related manners. For example, a software agent on a device can be configured to obtain and transmit data about device usage to a separate connection management system, and a software application on the separate connection management system can be configured to receive and process the data.

Figure 2:
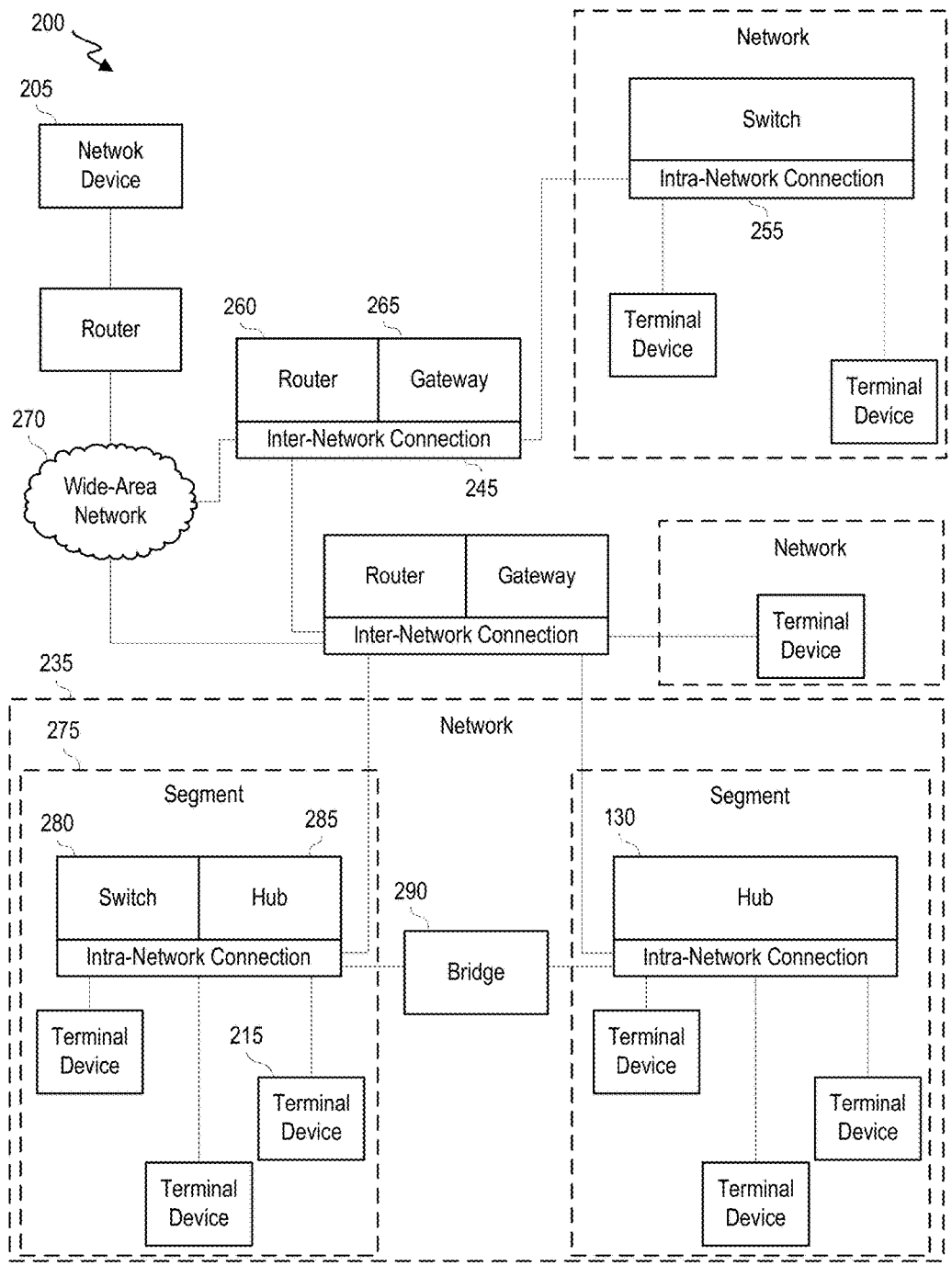
FIG. 2 shows a block diagram of another embodiment of a network interaction system.

FIG. 2 shows a block diagram of another embodiment of a network interaction system 200. Generally, FIG. 2 illustrates a range of components configured and arranged to enable a network device 205 to communicate with one or more terminal devices 215. The depicted instance includes nine terminal devices 215 included in three local-area networks 235.

In some instances, a communication from network device 205 includes destination data (e.g., a destination IP address) that at least partly or entirely indicates which terminal device is to receive the communication. Network interaction system 200 can include one or more inter-network connection components 240 and/or one or more intra-network connection components 255 that can process the destination data and facilitate appropriate routing.

Each inter-network connection components 245 can be connected to a plurality of networks 235 and can have multiple network cards installed (e.g., each card connected to a different network). For example, an inter-network connection component 245 can be connected to a wide-area network 270 and one or more local-area networks 235. In the depicted instance, in order for a communication to be transmitted from network device 205 to any of the terminal devices, in the depicted system, the communication must be handled by multiple inter-network connection components 245.

When an inter-network connection component 245 receives a communication (or a set of packets corresponding to the communication), inter-network connection component 245 can determine at least part of a route to pass the communication to a network associated with a destination. The route can be determined using, for example, a routing table (e.g., stored at the router), which can include one or more routes that are pre-defined, generated based on an incoming message (e.g., from another router or from another device) or learned.

Examples of inter-network connection components 245 include a router 260 and a gateway 265. An inter-network connection component 245 (e.g., gateway 265) may be configured to convert between network systems or protocols. For example, gateway 265 may facilitate communication between Transmission Control Protocol/Internet Protocol (TCP/IP) and Internetwork Packet Exchange/Sequenced Packet Exchange (IPX/SPX) devices.

Upon receiving a communication at a local-area network 235, further routing may still need to be performed. Such intra-network routing can be performed via an intra-network connection component 255, such as a switch 280 or hub 285. Each intra-network connection component 255 can be connected to (e.g., wirelessly or wired, such as via an Ethernet cable) multiple terminal devices 215. Hub 285 can be configured to repeat all received communications to each device to which it is connected. Each terminal device can then evaluate each communication to determine whether the terminal device is the destination device or whether the communication is to be ignored. Switch 280 can be configured to selectively direct communications to only the destination terminal device.

In some instances, a local-area network 235 can be divided into multiple segments, each of which can be associated with independent firewalls, security rules and network protocols. An intra-network connection component 255 can be provided in each of one, more or all segments to facilitate intra-segment routing. A bridge 280 can be configured to route communications across segments 275.

To appropriately route communications across or within networks, various components analyze destination data in the communications. For example, such data can indicate which network a communication is to be routed to, which device within a network a communication is to be routed to or which communications a terminal device is to process (as opposed to ignore). However, in some instances, it is not immediately apparent which terminal device (or even which network) is to participate in a communication from a network device.

To illustrate, a set of terminal devices may be configured so as to provide similar types of responsive communications. Thus, it may be expected that a query in a communication from a network device may be responded to in similar manners regardless to which network device the communication is routed. While this assumption may be true at a high level, various details relating to terminal devices can give rise to particular routings being advantageous as compared to others. For example, terminal devices in the set may differ from each other with respect to (for example) which communication channels are supported, location and/or network proximity to a network device and/or characteristics of associated agents (e.g., availability, etc.). Accordingly, select routings may facilitate faster responses that more accurately and/or completely respond to a network-device communication. A complication is that static routings mapping network devices to terminal devices may fail to consider variations in communication topics, channel types, agent availability, and so on.

Figure 3A:
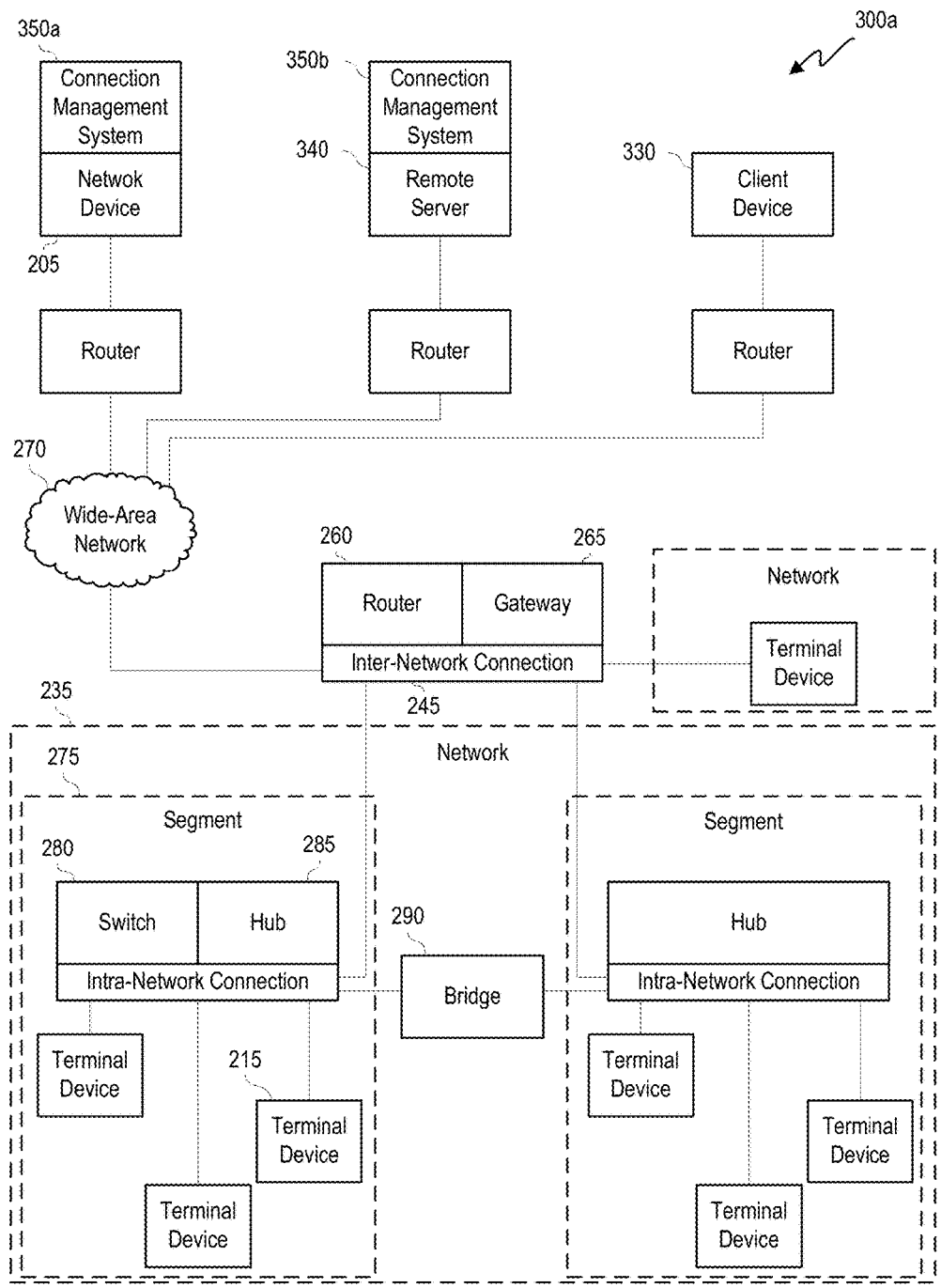
FIGS. 3A-3C show block diagrams of other embodiments of a network interaction system that includes a connection management system.
Figure 3B:
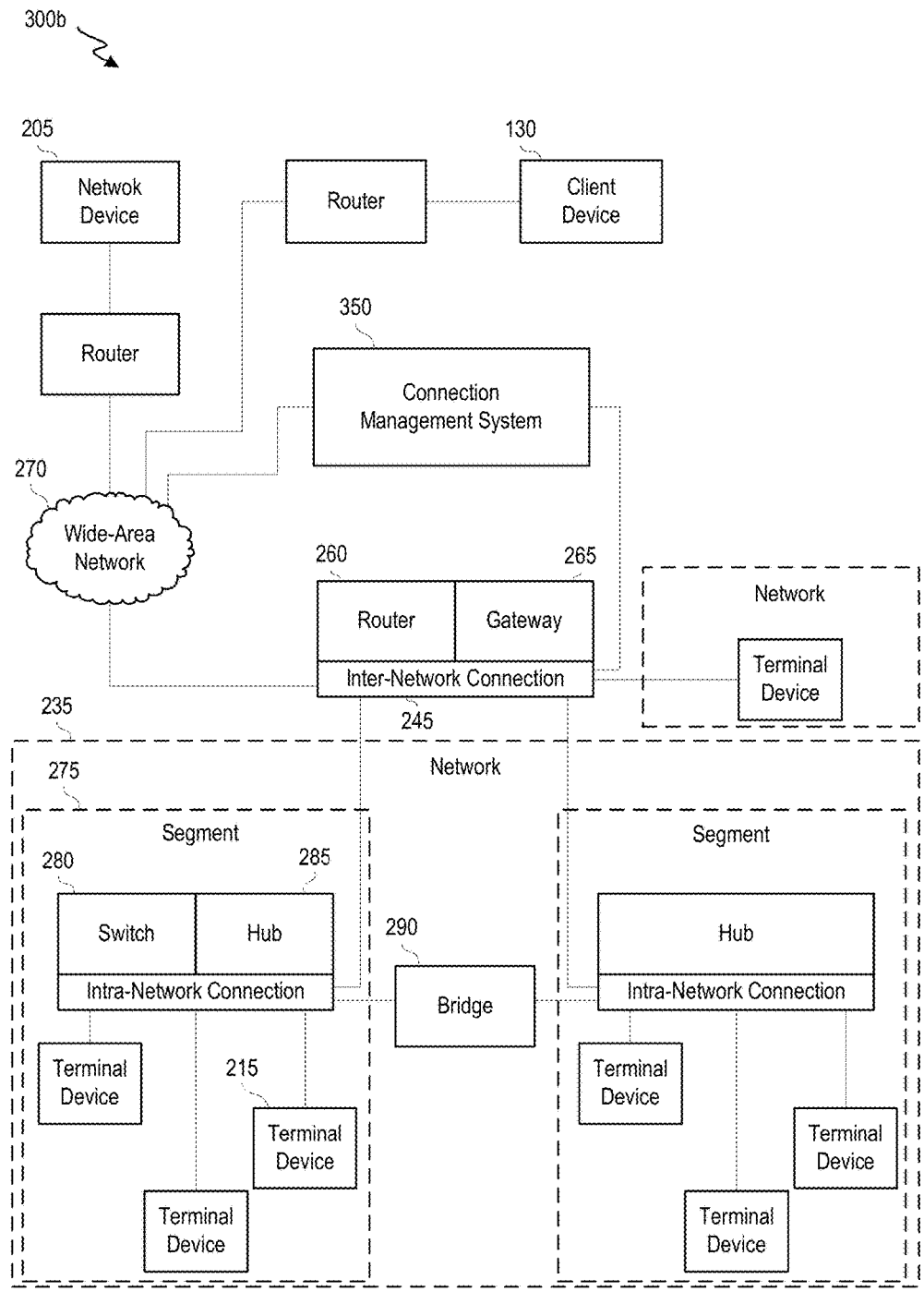
Figure 3C:
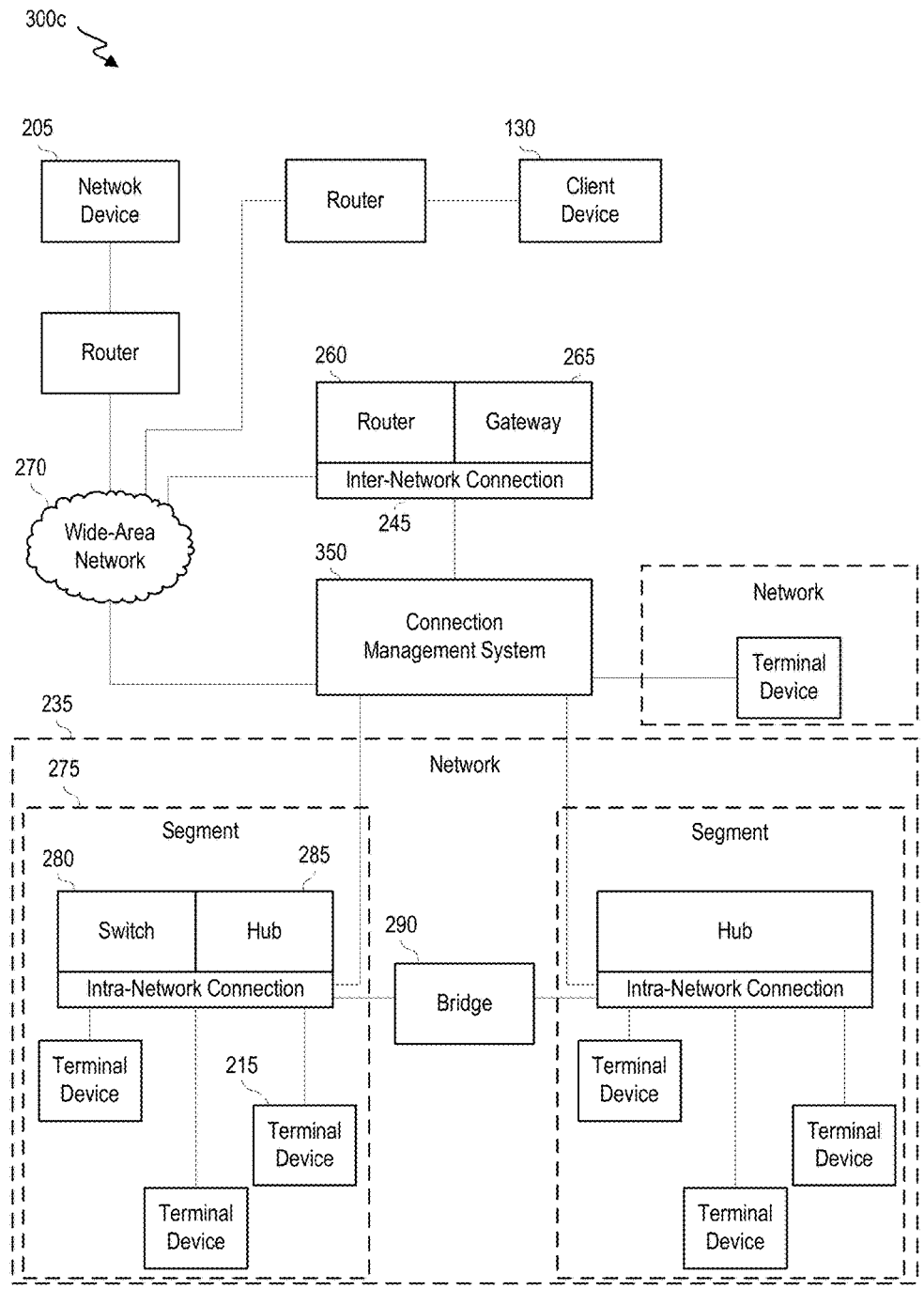

FIGS. 3A-3C show block diagrams of other embodiments of a network interaction system 300a-c that includes a connection management system. Each of the depicted systems 300a-c show only 2 local-area networks 235 for simplicity, though it can be appreciated that embodiments can be extended to expand the number of local-area networks. Each of systems 300a-c include a connection management system 350, which can identify which terminal device is to communicate with network device 205, can establish and manage (e.g., maintain or close) connection channels, can determine whether and when to re-route communications in an communication session, and so on. Thus, connection management system 350 can be configured to dynamically, and in real-time, evaluate communications, agent availability, capabilities of terminal devices or agents, and so on, to influence routing determinations.

In FIG. 3A, connection management system 350 is associated with each of network device 205 and a remote server 340 (e.g., connection management system 350a is associated with network device 205 and connection management system 350b is associated with remote server 340). For example, connection management system 350a and/or connection management system 350b can be installed or stored as an application on each of network device 205 and remote server 340, respectively. Execution of the application(s) can facilitate, for example, a communication between network device 205 and remote server 340 to identify a terminal device 215 selected to participate in a communication session with network device 205. The identification can be made based on one or more factors disclosed herein (e.g., availability, connections between a communication's topic/ level of detail with agents' or terminal devices' resource sets, estimated latency, channel-type availability, and so on).

A client device 330 can provide client data indicating how routing determinations are to be made. For example, such data can include: indications as to how particular characteristics are to be weighted or constraints or inclinations (e.g., relating to load balancing or estimated response latency). Client data can also include specifications related to when communication channels are to be established (or closed) or when communications are to be re-routed to a different network device. Client data can be used to define various client-specific rules, such as rules for communication routing; channel establishment, management or closing; communication re-routing; communication type-identification, and so on.

Connection management system 350b executing on remote server 340 can monitor various metrics relating to terminal devices (e.g., relating to a client), such as which communication channels are supported, location and/or network proximity to a network device, communication latency and/or stability with the terminal device, a type of the terminal device, a capability of the terminal device, whether the terminal device (or agent) has communicated with a network device (or user) before and/or characteristics of associated agents (e.g., languages spoken, availability, etc.). Accordingly, communication management system 350b may be enabled to select routings to facilitate faster responses that more accurately and/or completely respond to a network-device communication based on the metrics.

In the example depicted in FIG. 3A, a communication session between network device 205 and remote server 340 can facilitate early identification of a destination address. Network device 205 may then use the destination address to direct subsequent communications. For example, network device 205 may send an initial communication to remote server 340 (e.g., via one or more inter-network connections and a wide-area network), and remote server 340 may identify one or more corresponding clients. Remote server 340 may then identify a set of terminal devices associated with the one or more corresponding clients and obtain metrics for those terminal devices. The metrics can be evaluated (e.g., by remote server 340) so as to select a terminal device to involve in a communication session, and data relating to the terminal device (e.g., an IP address) can be sent to network device 205. In some embodiments, remote server 340 may continuously or periodically obtain and evaluate metrics for various terminal devices and store evaluation results in a data store. In such embodiments, upon identifying a set of terminal devices associated with the one or more corresponding clients, remote server 340 can access the stored evaluation results from the data store and select a terminal device to involve in the communication session based on the stored evaluation results.

In FIG. 3B, connection management system 350 can be configured to serve as a relay and/or destination address. Thus, for example, a set of network devices 205 may transmit communications, each identifying connection management system 350 as a destination. Connection management system 350 can receive each communication and can concurrently monitor a set of terminal devices (e.g., so as to generate metrics for each terminal device). Based on the monitoring and a rule, connection management system 350 can identify a terminal device 215 to which it may relay each communication. Depending on the embodiment, terminal device communications may similarly be directed to a consistent destination (e.g., of connection management system 350) for further relaying, or terminal devices may begin communicating directly with corresponding network devices. These embodiments can facilitate efficient routing and thorough communication monitoring.

The embodiment depicted in FIG. 3C is similar to that in FIG. 3B. However, in some embodiments, connection management system 350 is directly connected to intra-network components (e.g., terminal devices, intra-network connections, or other).

It will be appreciated that many variations of FIGS. 3A-3C are contemplated. For example, connection management system 350 may be associated with a connection component (e.g., inter-network connection component 245 or intra-network connection component 255) such that an application corresponding to connection management system 350 (or part thereof) is installed on the component. The application may, for example, perform independently or by communicating with one or more similar or related applications (e.g., executing on one or more other components, network devices or remotes servers).

Figure 4:
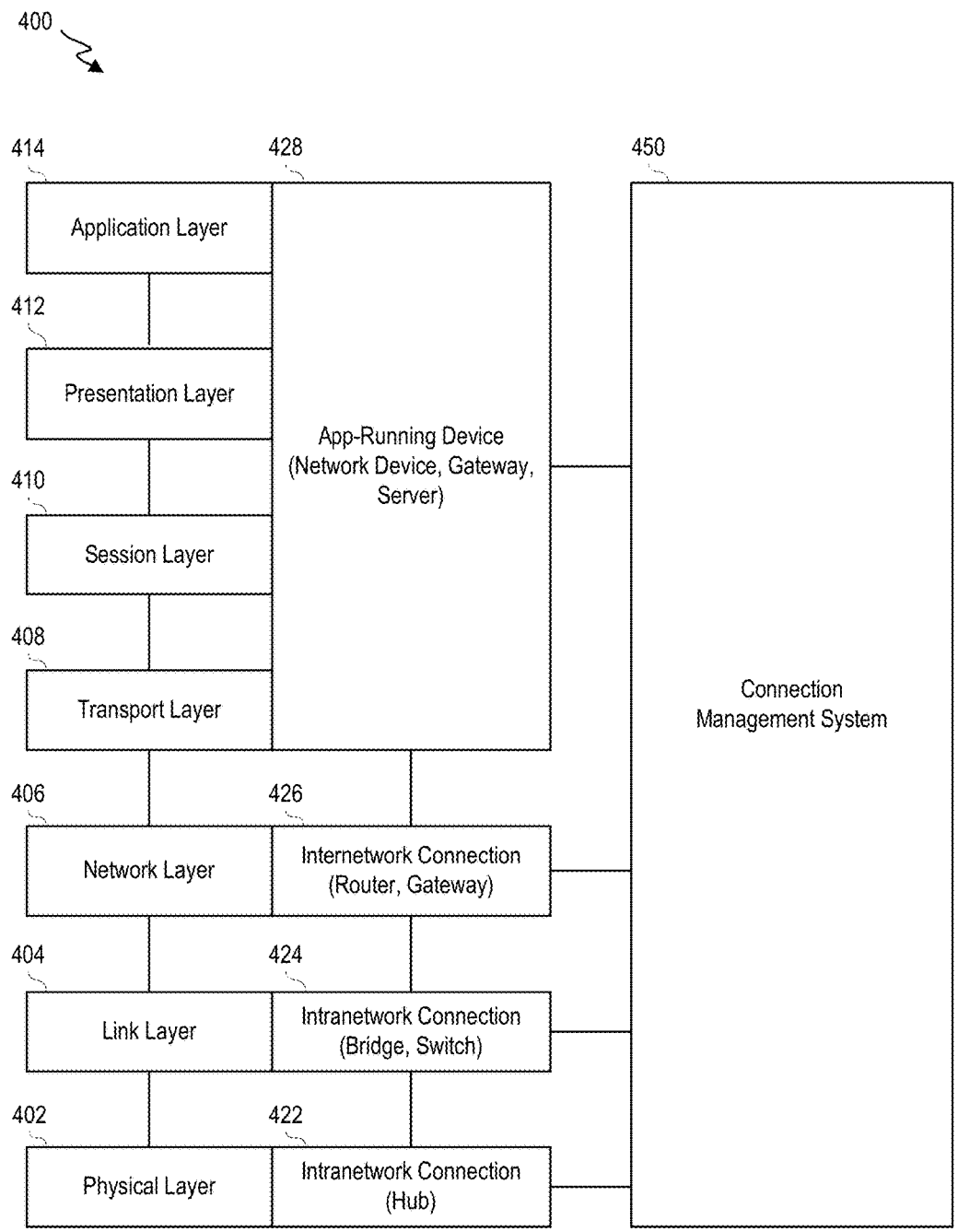
FIG. 4 shows a representation of a protocol-stack mapping of connection components' operation.

FIG. 4 shows a representation of a protocol-stack mapping 400 of connection components' operation. More specifically, FIG. 4 identifies a layer of operation in an Open Systems Interaction (OSI) model that corresponds to various connection components.

The OSI model can include multiple logical layers 402-414. The layers are arranged in an ordered stack, such that layers 402-412 each serve a higher level and layers 404-414 is each served by a lower layer. The OSI model includes a physical layer 402. Physical layer 402 can define parameters physical communication (e.g., electrical, optical, or electromagnetic). Physical layer 402 also defines connection management protocols, such as protocols to establish and close connections. Physical layer 402 can further define a flow-control protocol and a transmission mode.

A link layer 404 can manage node-to-node communications. Link layer 404 can detect and correct errors (e.g., transmission errors in the physical layer 402) and manage access permissions. Link layer 404 can include a media access control (MAC) layer and logical link control (LLC) layer.

A network layer 406 can coordinate transferring data (e.g., of variable length) across nodes in a same network (e.g., as datagrams). Network layer 406 can transform a logical network address to a physical machine address.

A transport layer 408 can manage transmission and receipt quality. Transport layer 408 can provide a protocol for transferring data, such as a Transmission Control Protocol (TCP). Transport layer 408 can perform segmentation/desegmentation of data packets for transmission and can detect transmission errors occurring in layers 402-406. A session layer 410 can initiate, maintain and terminate connections between local and remote applications. Sessions may be used as part of remote-procedure interactions. A presentation layer 412 can encrypt, decrypt and format data based on data types known to be accepted by an application or network layer.

An application layer 414 can interact with software applications that control or manage communications. Via such applications, application layer 414 can (for example) identify destinations, local resource states or availability and/or communication content or formatting. Various layers 402-414 can perform other functions as available and applicable.

Intra-network connection components 422, 424 are shown to operate in physical layer 402 and link layer 404. More specifically, a hub can operate in the physical layer, such that operations can be controlled with respect to receipts and transmissions of communications. Because hubs lack the ability to address communications or filter data, they possess little to no capability to operate in higher levels. Switches, meanwhile, can operate in link layer 404, as they are capable of filtering communication frames based on addresses (e.g., MAC addresses).

Meanwhile, inter-network connection components 426, 428 are shown to operate on higher levels (e.g., layers 406-414). For example, routers can filter communication data packets based on addresses (e.g., IP addresses). Routers can forward packets to particular ports based on the address, so as to direct the packets to an appropriate network. Gateways can operate at the network layer and above, perform similar filtering and directing and further translation of data (e.g., across protocols or architectures).

A connection management system 450 can interact with and/or operate on, in various embodiments, one, more, all or any of the various layers. For example, connection management system 450 can interact with a hub so as to dynamically adjust which terminal devices the hub communicates. As another example, connection management system 450 can communicate with a bridge, switch, router or gateway so as to influence which terminal device the component selects as a destination (e.g., MAC, logical or physical) address. By way of further examples, a connection management system 450 can monitor, control, or direct segmentation of data packets on transport layer 408, session duration on session layer 410, and/or encryption and/or compression on presentation layer 412. In some embodiments, connection management system 450 can interact with various layers by exchanging communications with (e.g., sending commands to) equipment operating on a particular layer (e.g., a switch operating on link layer 404), by routing or modifying existing communications (e.g., between a network device and a terminal device) in a particular manner, and/or by generating new communications containing particular data (e.g., new destination addresses) based on the existing communication. Thus, connection management system 450 can influence communication routing and channel establishment (or maintenance or termination) via interaction with a wide range of devices and/or via influencing operating at a wide range of protocol-stack layers.

Figure 5:
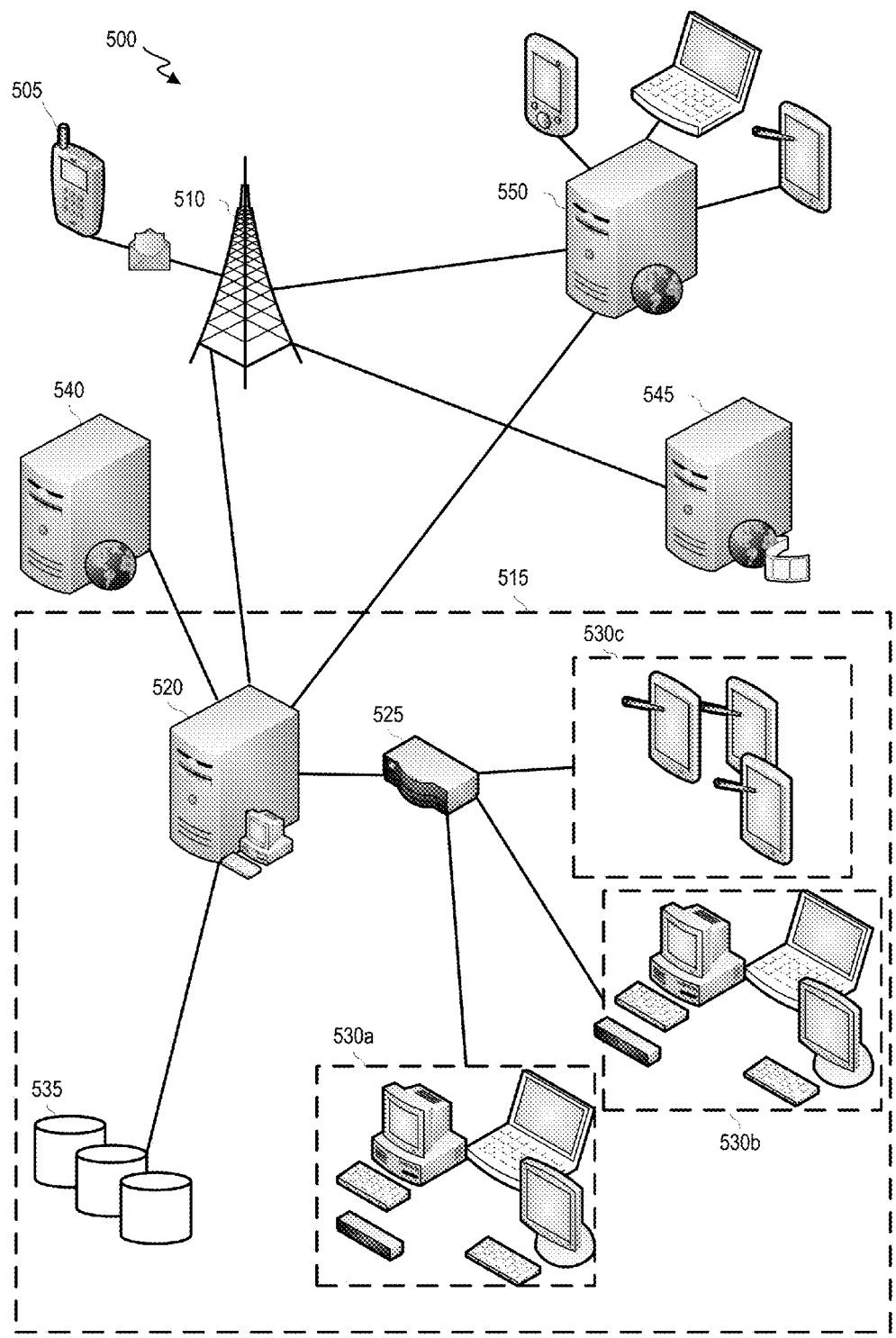
FIG. 5 represents a multi-device communication exchange system according to an embodiment.

FIG. 5 represents a multi-device communication interaction system 500 according to an embodiment. System 500 includes a network device 505 configured to communicate with a various terminal devices over various types of communication channels.

In the depicted instance, network device 505 can transmit a communication over a cellular network (e.g., via a base station 510). The communication can be routed to an operative network 515. Operative network 515 can include a connection management system 520 that receives the communication and identifies which terminal device is to respond to the communication. Such determination can depend on identifying a client to which that communication pertains (e.g., based on a content analysis or user input indicative of the client) and determining one or more metrics for each of one or more terminal devices associated with the client. For example, in FIG. 5, each cluster of terminal devices 530a-c can correspond to a different client. The terminal devices may be locationally co-located or disperse. The metrics may be determined based on stored or learned data and/or real-time monitoring (e.g., based on availability).

Connection management system 520 can communicate with various terminal devices via one or more routers 525 or other inter-network or intra-network connection components. Connection management system 520 may obtain, analyze and/or store data from or relating to communications, terminal-device operations, client rules, and/or user-associated actions (e.g., interaction activity on a network site, etc.) at one or more data stores. Such data may influence communication routing.

Notably, various other devices can further be used to influence communication routing and/or processing. For example, in the depicted instance, connection management system 520 also is connected to a network server 540. Thus, connection management system 540 can retrieve data of interest, such as technical object details and additional data, and so on.

Network device 505 may also be connected to a network server (e.g., including a streaming network server 545). In some instances, communication with such a server provided an initial option to initiate a communication session with connection management system 520. For example, network device 505 may detect that, while visiting a particular network site, a communication engagement option is available and such an option can be presented.

One or more elements of communication system 500 can also be connected to a social-networking server 550. Social networking server 550 can aggregate data received from various user devices. Thus, for example, connection management system 520 may be able to estimate a general (or user-specific) polarity towards a particular topic or estimate a general action of a user or type of users.

Figure 6:
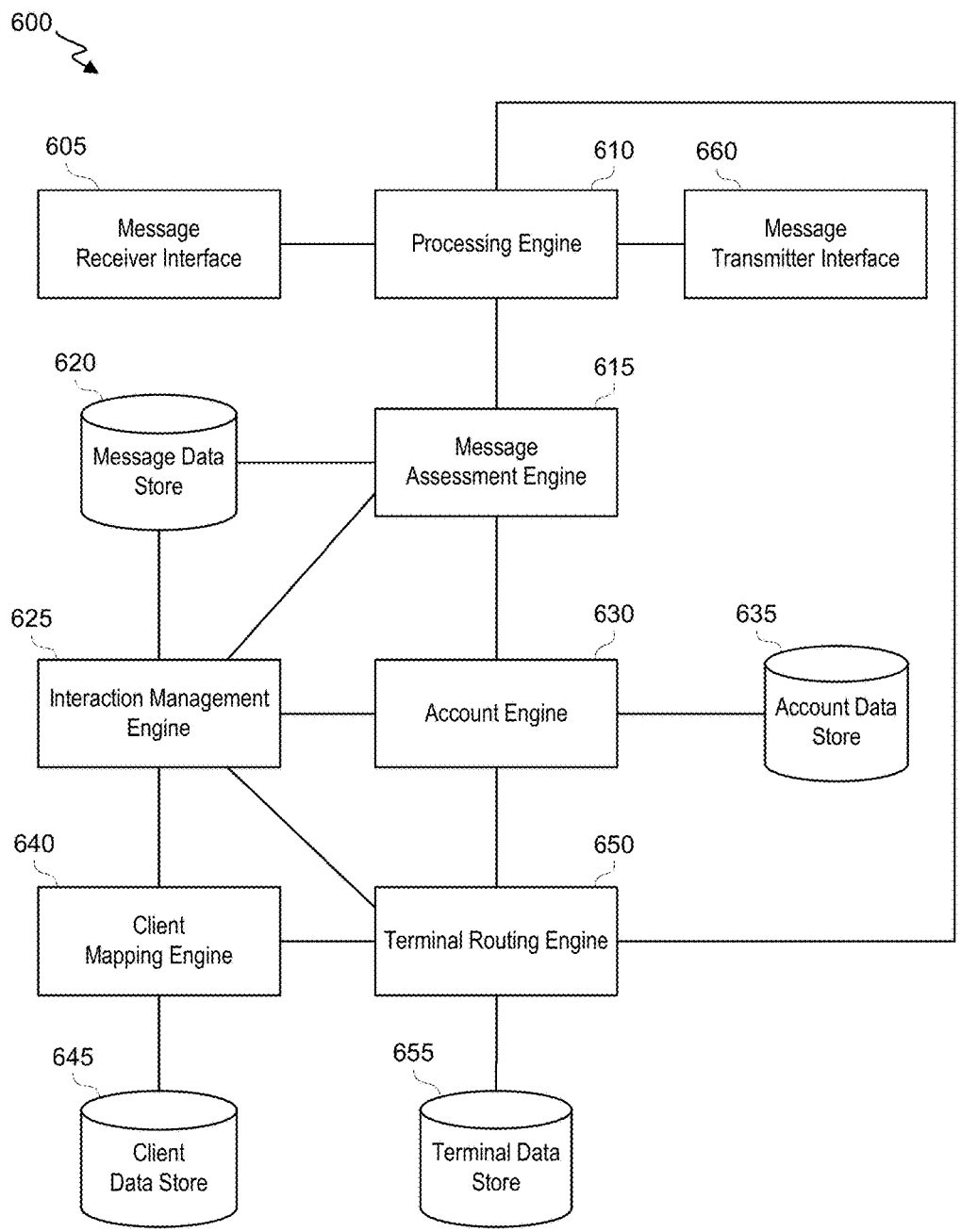
FIG. 6 shows a block diagram of an embodiment of a connection management system.

FIG. 6 shows a block diagram of an embodiment of a connection management system 600. A message receiver interface 605 can receive a message. In some instances, the message can be received, for example, as part of a communication transmitted by a source device (e.g., housed separately from connection management system 600 or within a same housing), such as a network device or terminal device. In some instances, the communication can be part of a series of communications or a communicate session, which can include a series of messages or message being routed between two devices (e.g., a network device and terminal device). This message or communication session may be part of and/or may define an interaction between the devices. A communication channel or operative channel can include one or more protocols (e.g., routing protocols, task-assigning protocols and/or addressing protocols) used to facilitate routing and a communication session between the devices.

In some instances, the message can include a message generated based on inputs received at a local or remote user interface. For example, the message can include a message that was generated based on button or key presses or recorded speech signals. In one instance, the message includes an automatically generated message, such as one generated upon detecting that a network device is presenting a particular app page or network interface or has provided a particular input command (e.g., key sequence). The message can include an instruction or request, such as one to initiate a communication session.

In some instances, the message can include or be associated with an identifier of a client. For example, the message can explicitly identify the client (or a device associated with the client); the message can include or be associated with a network interface or app page associated with the client; the message can include or be associated with a destination address associated with a client; or the message can include or be associated with an identification of an object associated with the client. To illustrate, a network device may be presenting an app page of a particular client, which may provide an option to transmit a communication to an agent. Upon receiving user input corresponding to a message, a communication may be generated to include the message and an identifier of the particular client.

A processing unit 610 may process a received communication and/or message. Processing can include, for example, extracting one or more particular data elements (e.g., a message, a client identifier, a network-device identifier, a user or user protocol identifier, and so on). Processing can include transforming a formatting or communication type (e.g., to be compatible with a particular device type, operating system, communication-channel type, protocol and/or network).

A message determination unit 615 may determine the message. The determination can include identifying, for example, one or more types or tags for the message. Examples of type or tag types can include (for example) topic, message polarity, complexity, and urgency. A difference between determining a type of message and tagging a message can be that types can be limited (e.g., according to a predefined set of type options), while tags can be open. A topic can include, for example, an object, a technical issue, a use question, a complaint, or other suitable topic. A type or tag can be determined, for example, based on a semantic analysis of a message (e.g., by identifying keywords, sentence structures, repeated words, punctuation characters and/or non-article words); user input (e.g., having selected one or more types); and/or message-associated statistics (e.g., typing speed and/or response latency).

In some instances, message determination unit 615 can determine a metric for a message. A metric can include, for example, a number of characters, words, capital letters, all-capital words or instances of particular characters or punctuation marks (e.g., exclamation points, question marks and/or periods). A metric can include a ratio, such as a fraction of sentences that end with an exclamation point (or question mark), a fraction of words that are all capitalized, and so on.

Message determination unit 615 can store a message, message metric and/or message statistic in a message data store 620. Each message can also be stored in association with other data (e.g., metadata), such as data identifying a corresponding source device, destination device, network device, terminal device, client, one or more types, one or more stages and/or message-associated statistics). Various components of connection management system 600 (e.g., message determination unit 615 and/or an interaction management unit 625) can query message data store 620 to retrieve query-responsive messages, message metrics and/or message statistics.

An interaction management unit 625 can determine to which device a communication is to be routed and how the receiving and transmitting devices are to communicate. Each of these determinations can depend, for example, on whether a particular network device (or any network device associated with a particular user) has previously communicated with a terminal device in a set of terminal devices (e.g., any terminal device associated with connection management system 600 or any terminal device associated with one or more particular clients).

In some instances, when a network device (or other network device associated with a sane user or user protocol (e.g., profile)) has previously communicated with a terminal device (e.g., about matters relating to a client), communication routing can be generally inclined towards the same terminal device. Other factors that may influence routing can include, for example, an inferred or identified user or agent polarity relating to the previous communication; a topic of a present communication (e.g., and an extent to which that relates to a topic of a previous communication and/or a resource set associated with one or more terminal devices or agents); whether the terminal device (or corresponding agent) is available; and/or an estimated response latency of the terminal device. Such factors may be considered absolutely or relative to similar metrics corresponding to other terminal devices. A re-routing rule (e.g., a client-specific or general rule) can indicate how such factors are to be evaluated and weighted to determine whether to forego agent consistency.

When a network device (or other network device associated with a same user or user protocol) has not previously communicated with a terminal device (e.g., about matters relating to a client), a terminal-device selection can be performed based on factors such as, for example, an extent to which various agents' resource set corresponds to a communication topic, availability of various agents at a time and/or over a channel type, types and/or capabilities of terminal devices (e.g., associated with the client), a language similarity between a user and agents. In one instance, a rule can identify how to determine a sub-parameter to one or more factors such as these and a weight to assign to each parameter. By combining (e.g., summing) weighted sub-parameters, a parameter for each agent can be determined. A terminal device selection can then be made by comparing terminal devices' parameters (e.g., to select a high or highest value).

With regard to determining how devices are to communicate, interaction management unit 625 can (for example) determine whether a terminal device is to respond to a communication via (for example) email, chat, SMS message, voice call, video chat, etc. A communication type can be selected based on, for example, a communication-type priority list (e.g., at least partly defined by a client or user); a type of a communication previously received from the network device, a complexity of a received message, capabilities of the network device, and/or an availability of one or more terminal devices. Appreciably, some communication types will result in real-time communication (e.g., where fast message response is expected), while others can result in asynchronous communication (e.g., where delays (e.g., of several minutes or hours) between messages are acceptable).

Further, interaction management unit 625 can determine whether a continuous channel between two devices should be established, used or terminated. A continuous channel can be structured so as to facilitate routing of communications from a network device to a specified terminal device. This inclination can persist even across message series (e.g., days, weeks or months). In some instances, a representation of a continuous channel (e.g., identifying an agent) can be included in a presentation to be presented on a network device. In this manner, a user can understand that communications are to be consistently routed.

In one instance, a parameter (e.g., a score or value, etc.) can be generated using one or more factors described herein and a rule (e.g., that includes a weight for each of the one or more factors) to determine a connection parameter corresponding to a network device and terminal device. The parameter may relate to an overall similarity or one specific to a communication or communication series. Thus, for example, the parameter may reflect a degree to which a terminal device is estimated to be suited to respond to a network-device communication. In some instances, analysis of the parameter can identify a terminal device to route a communication to and whether to establish, use or terminate a connection channel. When an analysis is used to both address a routing decision and a channel decision, a parameter relevant to each decision may be determined in a same, similar or different manner.

Thus, for example, it will be appreciated that different factors may be considered depending on whether the parameter is to estimate a strength of a long-term similarity compared to one to respond to a particular message query. For example, in the former instance, considerations of overall schedules and time zones may be important, while in the latter instance, immediate availability may be more highly weighted. A parameter can be determined for a single network-device/terminal-device combination, or multiple parameters can be determined, each characterizing a similarity between a network device and a different terminal device.

To illustrate, a set of three terminal devices associated with a client may be evaluated for determining candidate terminal devices for communication routing. A parameter may be generated for each that relates to a similarity for the particular communication. Each of the first two terminal devices may have previously communicated with a network device having transmitted the communication. An input from the network device may have indicated satisfaction with an interaction with the communication(s) with the first device. Thus, a past-interact sub-parameter (as calculated according to a rule) for the first, second and third devices may be 10, 5, and 0, respectively. (Negative satisfaction inputs may result in negative sub-parameters.) It may be determined that only the third terminal device is immediately available. It may be estimated that the second terminal device will be available for responding within 15 minutes, but that the first terminal device will not be available for responding until the next day. Thus, a fast-response sub-parameter for the first, second and third devices may be 1, 3 and 10. Finally, it may be estimated a degree to which an agent (associated with the terminal device) can communicate regarding a topic. It may be determined that an agent associated with the third terminal device can communicate with a network device at a higher level than those associated with the other two devices, resulting in sub-parameters of 3, 4 and 9. In this example, the rule does not include weighting or normalization parameters (though, in other instances, a rule may), resulting in parameters of 14, 11 and 19. Thus, the rule may indicate that the message is to be routed to a device with the highest parameter, that being the third terminal device. If routing to a particular terminal device is unsuccessful, the message can be routed to a device with the next-highest parameter, and so on.

A parameter may be compared to one or more absolute or relative thresholds. For example, parameters for a set of terminal devices can be compared to each other to identify a high parameter to select a terminal device to which a communication can be routed. As another example, a parameter (e.g., a high parameter) can be compared to one or more absolute thresholds to determine whether to establish a continuous channel with a terminal device. An overall threshold for establishing a continuous channel may (but need not) be higher than a threshold for consistently routing communications in a series of messages. This difference between the overall threshold and threshold for determining whether to consistently route communication may be because a strong similarity is important in the continuous-channel context considering the extended utility of the channel. In some embodiments, an overall threshold for using a continuous channel may (but need not) be lower than a threshold for establishing a continuous channel and/or for consistently routing communications in a series of messages.

Interaction management unit 625 can interact with an user data unit 630 in various contexts. For example, user data unit 630 may look up an identifier of a network device or terminal device in a protocol data store 635 to identify a protocol corresponding to the device. Further, user data unit 630 can maintain data about previous communication sessions (e.g., times, involved other device(s), channel type, resolution stage, topic(s) and/or associated client identifier), connection channels (e.g., indicating—for each of one or more clients—whether any channels exist, a terminal device associated with each channel, an establishment time, a usage frequency, a time of last use, any channel constraints and/or supported types of communication), user or agent preferences or constraints (e.g., related to terminal-device selection, response latency, terminal-device consistency, agent resource set, and/or communication-type preference or constraint), and/or user or agent characteristics (e.g., age, language(s) spoken, location, interests, and so on).

Further, interaction management unit 625 can alert user data unit 630 of various connection-channel actions, such that protocol data store 635 can be updated to reflect the current channel data. For example, upon establishing a channel, interaction management unit 625 can notify user data unit 630 of the establishment and identify one or more of: a network device, a terminal device, a user protocol and a client. protocol unit 635 can (in some instances) subsequently notify a user of the channel's existence such that the user can be aware of the agent consistency being availed.

Interaction management unit 625 can further interact with a client mapping unit 640, which can map a communication to one or more clients (and/or associated brands). In some instances, a communication received from a network device itself includes an identifier corresponding to a client (e.g., an identifier of a client, object provided by a client, network site, or app page). The identifier can be included as part of a message (e.g., which client mapping unit 640 may detect) or included as other data in a message-inclusive communication. Client mapping unit 640 may then look up the identifier in a client data store 645 to retrieve additional data about the client and/or an identifier of the client.

In some instances, a message may not particularly correspond to any client. For example, a message may include a general query. Client mapping unit 640 may, for example, perform a semantic analysis on the message, identify one or more keywords and identify one or more clients associated with the keyword(s). In some instances, a single client is identified. In some instances, multiple clients are identified. An identification of each client may then be presented via a network device such that a user can select a client to communicate with (e.g., via an associated terminal device).

Client data store 645 can include identifications of one or more terminal devices (and/or agents) associated with the client. A terminal routing unit 650 can retrieve data relating to each of one, more or all such terminal devices (and/or agents) so as to influence routing determinations. For example, terminal routing unit 650 may maintain a terminal data store 655, which can store data such as terminal devices' device types, operating system, communication-type capabilities, installed applications accessories, location and/or identifiers (e.g., IP addresses). Data can also include agent data, such as position, resource sets (e.g., topics that the agent is knowledgeable about), identifier metrics, working hours, language(s) spoken and/or location data. Some data can be dynamically updated. For example, data indicating whether a terminal device is available may be dynamically updated based on (for example) a communication from a terminal device (e.g., identifying whether the device is asleep, being turned off/on, idle/active, or identifying whether input has been received within a time period); a communication routing (e.g., indicative of whether a terminal device is involved in or being assigned to be part of a communication session); or a communication from a network device or terminal device indicating that a communication session has ended or begun.

It will be appreciated that, in various contexts, being engaged in one or more communication sessions do not necessarily indicate that a terminal device is not available to engage in another communication session. Various factors, such as communication types (e.g., message, email, chat, phone), client-identified or user-identified target response times, and/or system loads (e.g., generally or with respect to a user) may influence how many communication sessions a terminal device may be involved in.

When interaction management unit 625 has identified a terminal device to involve in a communication session or connection channel, it can notify terminal routing unit 650, which may retrieve any pertinent data about the terminal device from terminal data store 655, such as a destination (e.g., IP) address, device type, protocol, etc. Processing unit 610 can then (in some instances) modify the message-inclusive communication or generate a new communication (including the message) so as to have a particular format, comply with a particular protocol, and so on. In some instances, a new or modified message may include additional data, such as user data corresponding to a network device, a message chronicle, and/or client data.

A message transmitter interface 660 can then transmit the communication to the terminal device. The transmission may include, for example, a wired or wireless transmission to a device housed in a separate housing. The terminal device can include a terminal device in a same or different network (e.g., local-area network) as connection management system 600. Accordingly, transmitting the communication to the terminal device can include transmitting the communication to an inter- or intra-network connection component.

Figure 7:
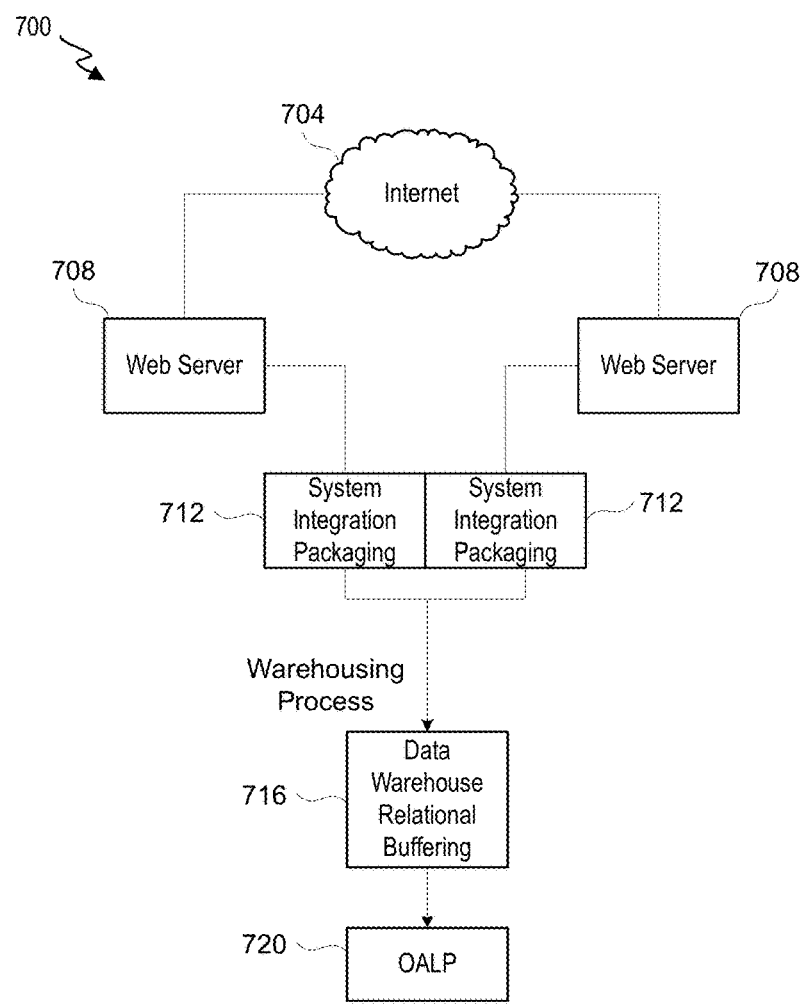
FIG. 7 is a schematic system block diagram of an exemplary method of the present invention.

FIG. 7 is a schematic system block diagram of the method of the present invention. The Web server 708 receives 'log-activity' (LA) packets over the Internet 704 from all subscribing entitles. An LA packet contains the client's identifier, a type of activity and its content, along with an arbitrary weight. System integration (SI) packaging 712 collects the LA packets into an XML file. The XML file is inserted to the relational database (DB).

SI is the process of creating a complex information system. This process may include designing or building a customized architecture or application (e.g. modification design), and integrating it with new or legacy hardware, packaged and custom software, and communications. The data warehouse 716 stores all activities in a relational database format that facilitates rapid access and retrieval by the Online Analytical Processing (OLAP) cube 720. OLAP cube 720 tracing engine facilitates rapid retrieval of multi-dimensional queries, providing insightful data regarding the network device's activities. The term "activity data," or "activities" as used herein, refer to user interactions with the network location.

Ordering Process

The information needed for the ordering (e.g. ranking) process is gathered over a predetermined time period (e.g. a month).

Stage 1. The activity data is accumulated.

Stage 2. The client chooses an activity. Executing the activity generates input to be ordered. E.g., the activity may be any activity that characterizes an action executed by the client within the network location.

Acquisition Activity (A.A.) After this, the client selects the unit of measure that the client intends to use, such as dollars, seconds, etc. This is the only stage that is not operated automatically in the system. Rather, it is controlled by the client.

Figure 8A:
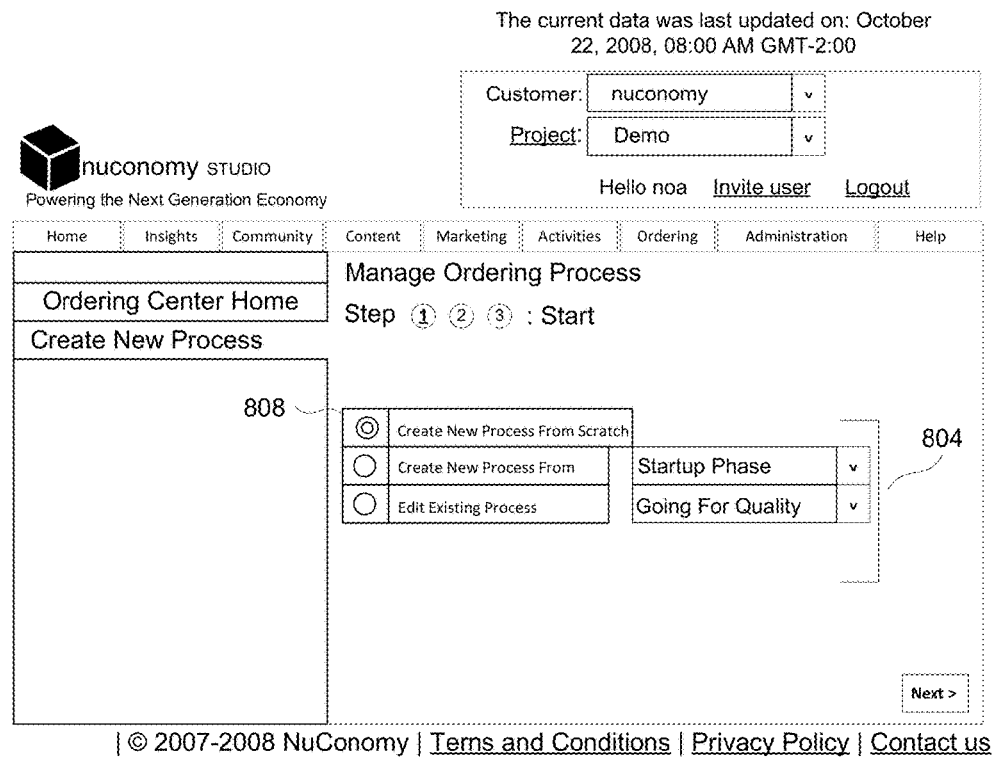
FIG. 8a is a screenshot of a preferred embodiment of a network location showing the "Manage Ordering Process" step in the Create New Process mode of the Ordering Process Wizard, constructed according to the principles of the present invention.

FIG. 8a is an exemplary screenshot of a preferred embodiment of a network location showing the "Manage Ordering Process" step in the Create New Process mode of the Ordering Process Wizard, constructed according to the principles of the present invention. There are 3 options 804 in the Manage Ordering Process step:

"Create new process from scratch"; 808 (this option is selected in this example)

"Create new process from" . . . a pull-down window lists various sub-options; and "Edit existing process" . . . a pull-down window lists various sub-options.

Figure 8B:
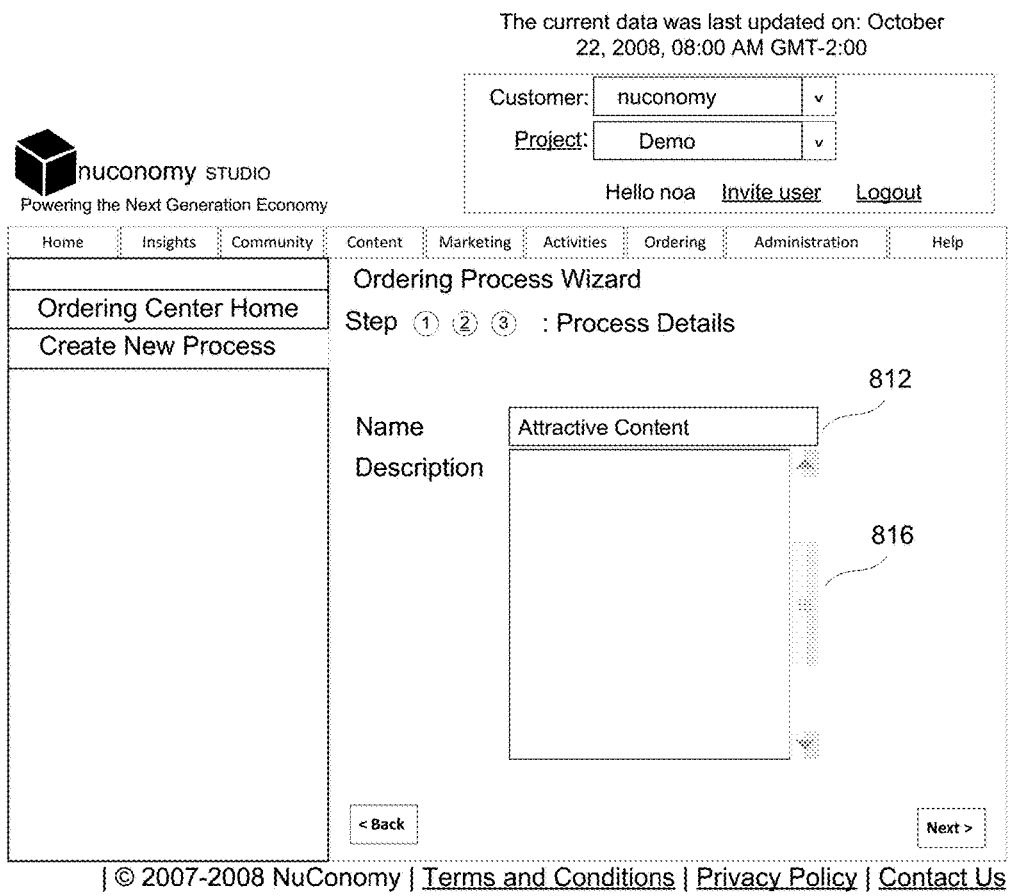
FIG. 8b is a screen shot of a preferred embodiment of a network location showing the "Naming" step in the Create New Process mode of the Ordering Process Wizard, constructed according to the principles of the present invention.

FIG. 8*b* is an exemplary screenshot of a preferred embodiment of a network location interface showing the "Naming" step in the Create New Process mode of the Ordering Process Wizard, constructed according to the principles of the present invention. The Naming step enables entry of a process Name 812 and Description 816 in corresponding windows.

Discover who are the network location's best reporters

Figure 8C:
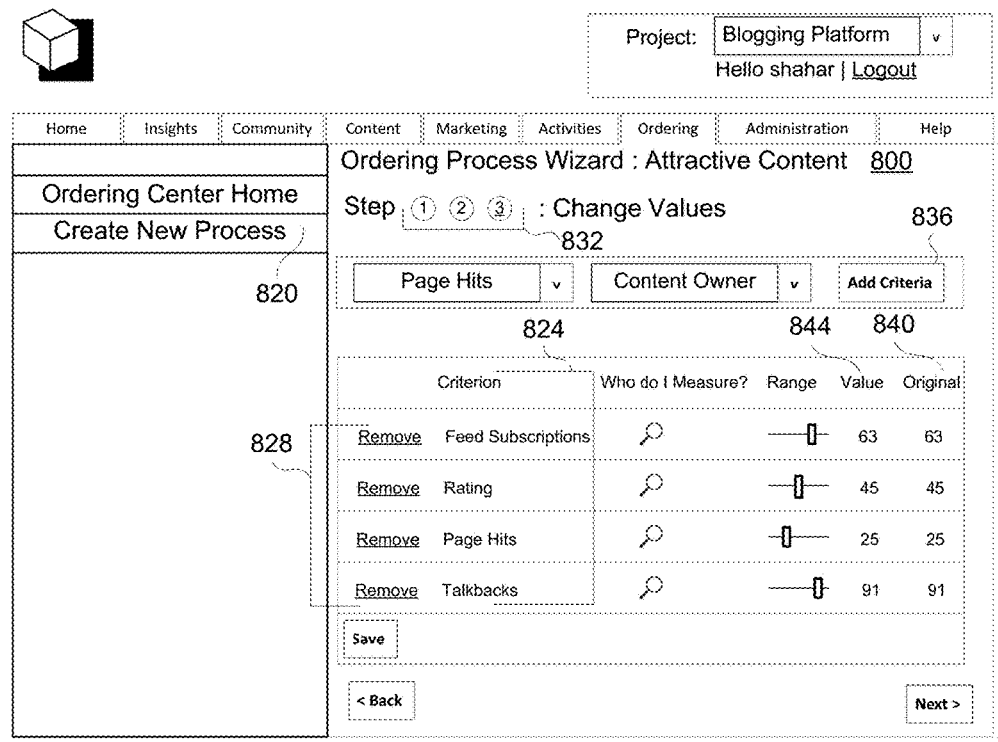
FIG. 8c is a screenshot of one embodiment of a network location showing the "Change values" step in the Ordering Process Wizard, constructed according to the principles of the present invention.

FIG. 8*c* is an exemplary screenshot of one embodiment of a network location showing the "Change values" step 114 in Create New Process Mode of the Ordering Process Wizard, constructed according to the principles of the present invention. Ordering Process Wizard 100 has two modes 103:

Ordering Center Home; and

Create a New Process 820, which is shown in progress in Ordering Process Wizard 800.

Change values step 832 is the 3rd of three steps in creating a new process.

The present invention can create any number of "contribution ordering processes" using the User Interface (UI) of FIG. 8*c*. The original values for various criterion 840 can be replaced with updated values 844. Criteria 824 can be removed 828 or added 836 through the User Interface.

FIG. 8*d* is a screenshot of a preferred embodiment of a network location displaying the "Ordering Dashboard" on the Ordering Center HomePage, constructed according to the principles of the present invention. Generally, the processes that have been input are displayed by name 848 and date and time of the last update 852.

FIG. 9*a* is a screenshot of the Activity Correlation Model 900*a*, constructed according to the principles of the present invention.

Stage 3. Correlation Matrix: At this stage, the system finds the correlation between the selected activity at stage 2 above and other activities in the system. In other words, the system finds graphical patterns identical to the conduct of a certain activity (for example, clicking on an advertisement) that was chosen. After the connection was found between the different graphs, a formalized ordering is created in the following manner. The connections are then organized between different activities in a table, according to the order of the correlation strength between them.

Every activity receives an "identifier," which encompasses the correlation between the activity and the activity that needs to be improved, such as selecting a displayed object description or object assignment. In the above mentioned table, for example, if the activity that a client intends to increase is requesting an object, the action of accessing the system is an activity that would receive a high identifier at ordering the connection to requesting the object. In that case the "identifier" might be 97.

The correlation process can be processed with every activity in the system. For example, if the network device is a content generator based network location, the correlation process can measure the input volume attributable to a certain device or group of devices over a specified period. This is determined from the number of selections of a displayed object description in that article that was written by a certain writer that is assigned to a specific class in the network location. If the client is a network location of electronic devices, the volume of input by the device generator can be determined by applying the ordering process.

Activity Correlation Model 900*a*, for example shows the correlation between Object Request 904 and Logins 908 to be 0.97, as indicated by reference block number 912.

Discover the Network Locations Top Contributing Content Elements

Figure 9B:
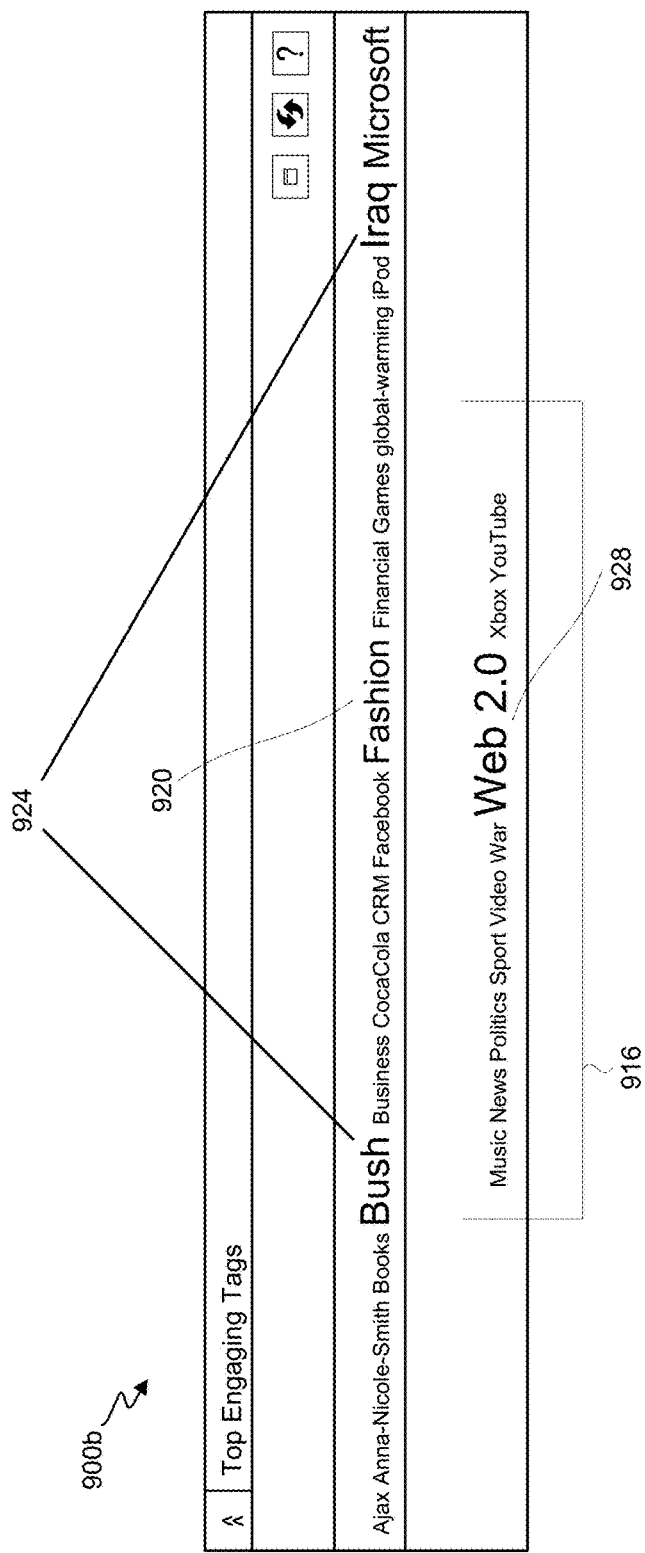
FIG. 9b is a screenshot illustrating the ordering of the "Top Engaging Tags," constructed according to the principles of the present invention.

FIG. 9*b* is a screenshot illustrating the ordering of the "Top Engaging Tags," constructed according to the principles of the present invention. What actually makes the network location tick? With the present invention a network location can dynamically identify device content. Tags are keywords that describe the content of a network location, bookmark, image, or user generated publication (e.g. blog) entry. Tags help network devices search for relevant content. Tag-enabled network location services include bookmarking locations, such as del.icio.us, image sharing locations, such as Flickr and user generated publication tracking locations such as Technorati. Tags provide a useful way of organizing, retrieving and discovering information. Tags can also be used as a verb, as in tagging a user generated publication entry or searching for articles tagged with "sports." A tag cloud is a box containing a list of tags with the most frequently identified (e.g. popular) tags being displayed as darker and bigger than less frequently identified tags. Further techniques include those described, for example, in U.S. application Ser. No. 12/608,117, filed on Oct. 29, 2009, which is hereby incorporated by references in its entirety for all purposes.

A network location can determine the contribution of different tag contents using the contribution ordering (e.g. ranking) process (e.g. formula) created in conjunction with FIG. 1 above. Alternatively, the network location can determine specific criteria, such as what content element generated the most comments or the most network device selection of a displayed notification? Thus, in FIG. 9*b*, a tag cloud 900*b* is shown for a typical network location. The tag 'Web 2.0," 928, is the largest. The tags "Bush" and "Iraq" have an intermediate font 924. The tag "fashion" has the least enlarged font 920.

Understand the Exact Contribution of Your Operations (e.g. Campaign) or Device Attributors (e.g. Referrers)

Figure 10:
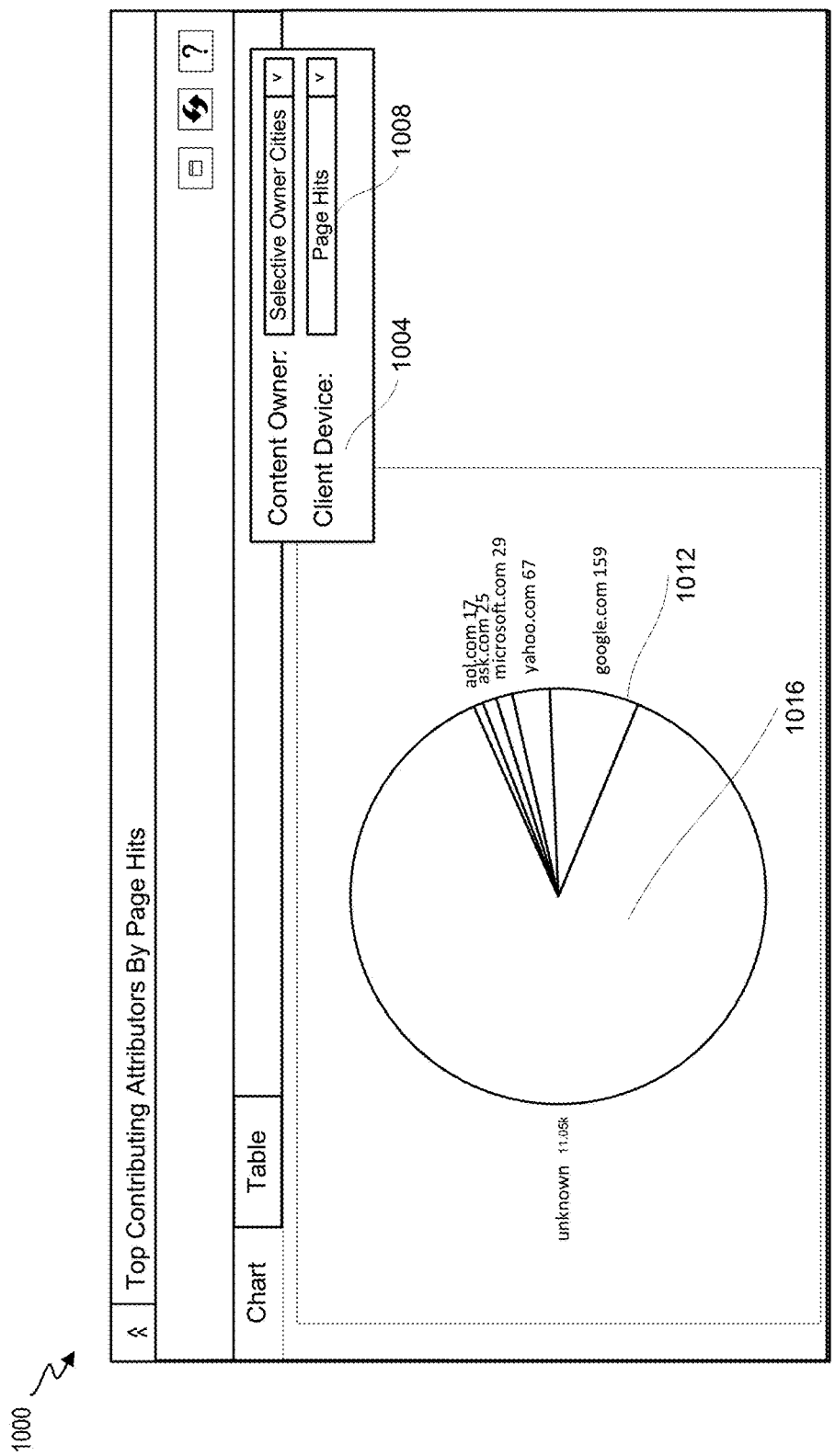
FIG. 10 is a screenshot illustrating the ordering of the "Top Contributing Referrers, by Page Hits," constructed according to the principles of the present invention.

FIG. 10 is a screenshot illustrating the ordering of the "Top Contributing Attributors by Page Hits" 1000, constructed according to the principles of the present invention. With the present invention the system can identify an exact output from a given input from each operation or from specific device attributors. Thus, in FIG. 10 the selected criterion for connected network device 1004 is page hits 1008. The top attributors shown is google.com 1012 with 159. The vast majority are unknown 1016.

Figure 11:
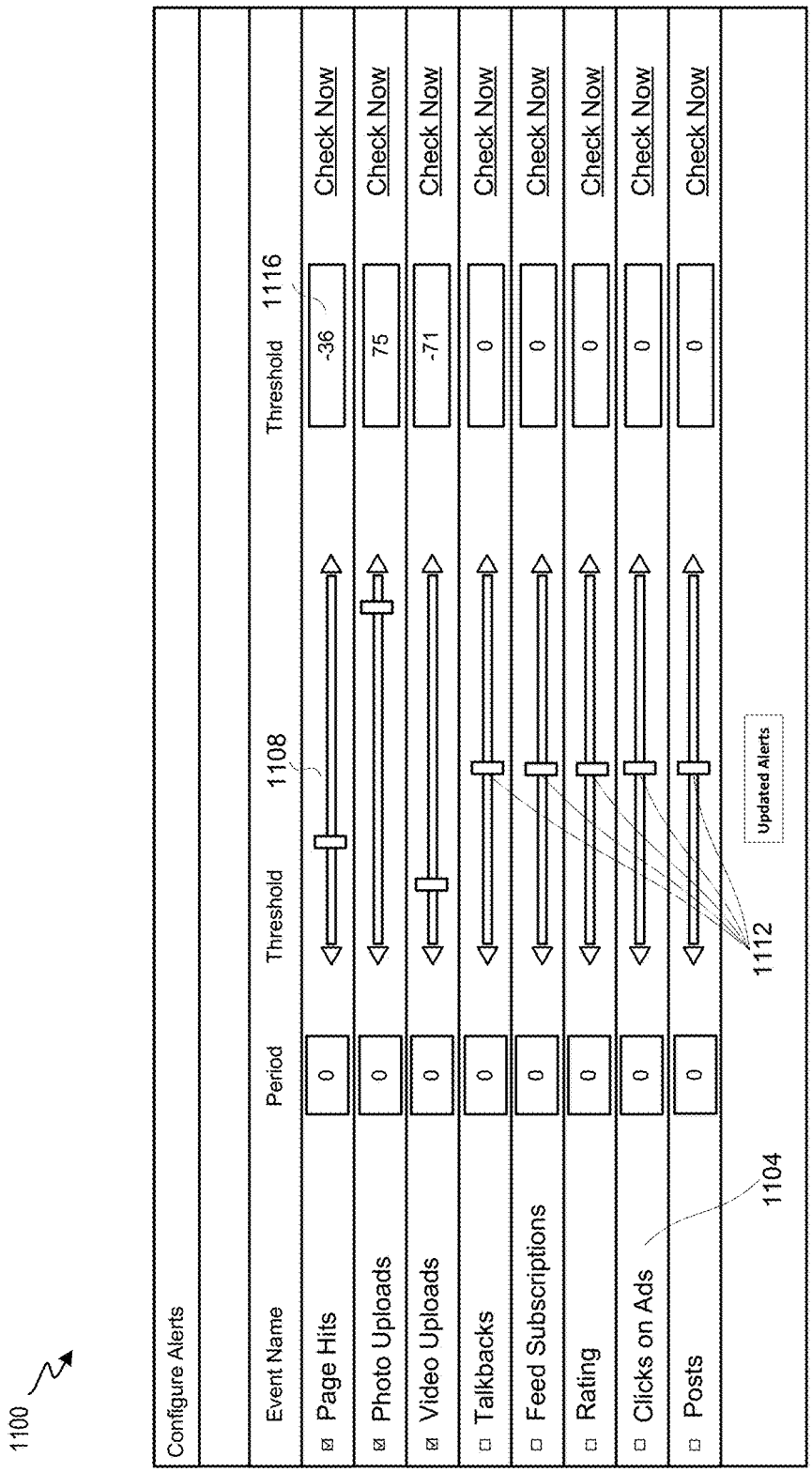
FIG. 11 is a screenshot illustrating "Configure Warnings," constructed according to the principles of the present invention.

Discover the network devices that the network location is about to lose before the network devices are lost FIG. 11 is a screenshot illustrating Configure Warnings, constructed according to the principles of the present invention. Some network devices may connect to a network location with a declining frequency over time. The network location may identify network devices susceptible to a declining connection frequency and target those network devices with a specific publication to retain them. With the present invention one can define warnings on changes in network device connection conduct corresponding to defined event types 1104. If a network device previously connected to the network location at a particular frequency, then when the frequency suddenly declines a warning is issued to the network location. Thresholds for each event type can be adjusted by a user interface object. For example, a user interface object, (e.g. slider 1108) is shown with the default position 1112 corresponding to a zero threshold. The numerical value 1116, in a plus or minus value is also shown.

Identify the Network Location's Attractive Content

How the system determine what content to display via the home page of the network location or each section? How does the system identify content that will contribute the most? The present invention can determine the exact contribution of each content element in the network location, whether it's articles, images, or videos.

As every feature of the present invention is presented in two easy to use aspects of the 2-way application programmer interface (API), which enables network device interaction, the system can take this information and embed it back into the network location as an attractive content list.

No Two Network Devices are the Identical

The present invention enables giving network devices connected to a network location a unique display. A network location may display a first type of content for a first network device and a second type of content for a second network device. As the present invention traces at the network device, the system can determine the interests of each network device connected to the network location.

FIG. 11 is a screenshot illustrating the traces of the SAGE engine, constructed according to the principles of the present invention. The SAGE engine executes algorithms on all the system data over intervals of time. The algorithms identify three types of anomalies in the system's accumulated data. The data is processed in time intervals of traces as follows:
  a. Increases/linear changes in the data after an interval of time 2104. FIG. 5 shows a report for a particular 24 hour interval 1208.
  b. Specific peaks in the data: the algorithm executes various cross-sections (recent interval data against data from a previous interval) and determines data that exceeds the defined threshold of the time interval being evaluated.
  c. Exponential changes in data are detected during the interval in comparison with similar previous intervals.

Figure 13:
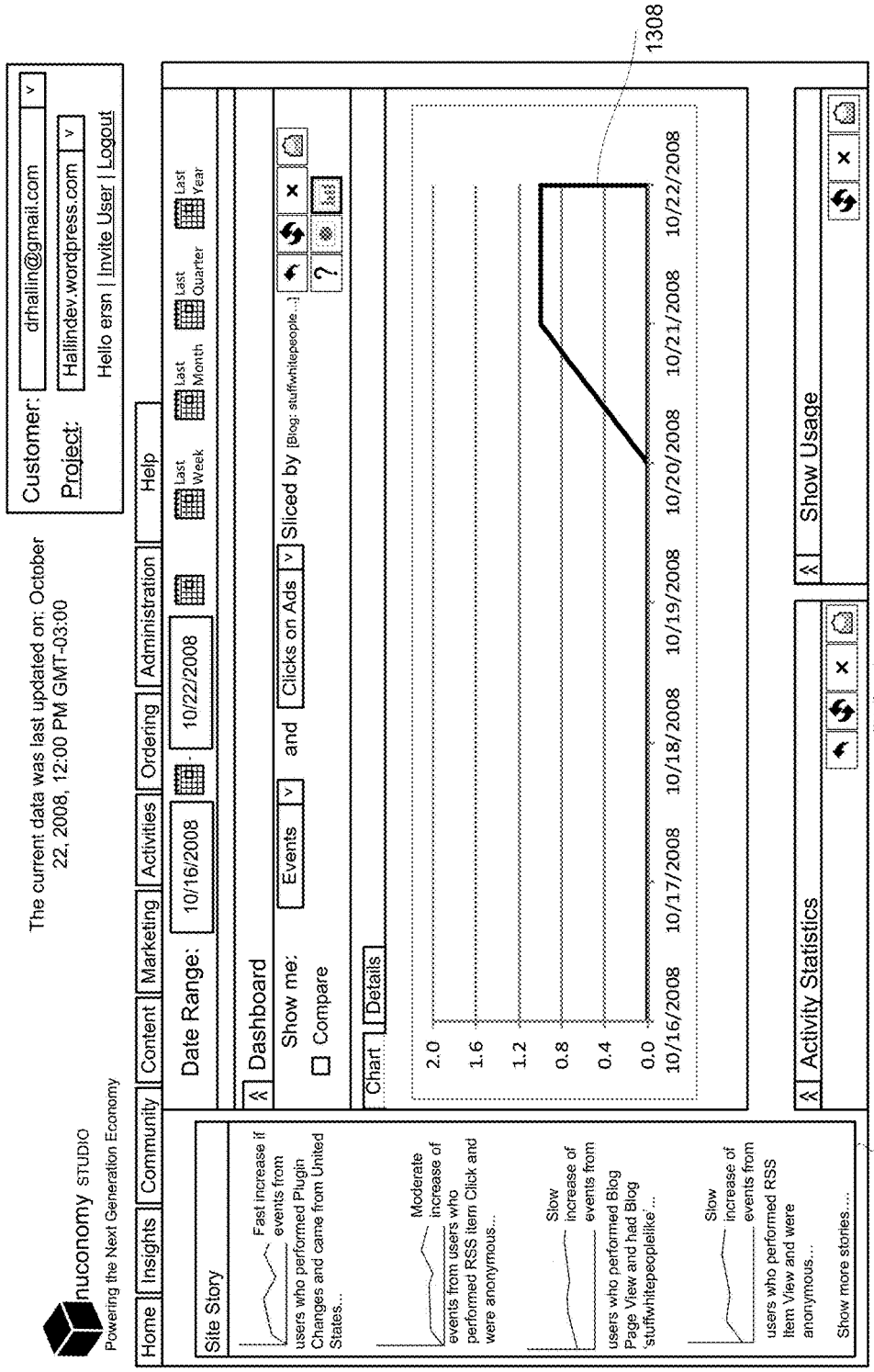
FIG. 13 is a screenshot illustrating a SAGE engine synopsis report, constructed according to the principles of the present invention.

FIG. 13 is a screenshot illustrating a SAGE engine synopsis, generated according to the principles of the present invention. "Device Stories" 1304 based on specific anomalies in the network location's activity data are presented. A user interface of a specific anomaly 1308 is shown.

Specific details are given in the above description to provide a thorough understanding of the embodiments. However, it is understood that the embodiments can be practiced without these specific details. For example, circuits can be shown as block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that portions of the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system, comprising:
one or more processors; and
one or more non-transitory machine-readable storage media containing instructions configured to cause the one or more processors to perform operations including:
receiving, on a computing device, one or more log-activity packets containing activity data, wherein the activity data represents one or more interactions with one or more content elements associated with a network location, and wherein an interaction has a corresponding value;
analyzing the one or more log-activity packets to track one or more interactions with the network location over a period of time;
calculating one or more values corresponding to the one or more tracked interactions;
receiving input corresponding to a selection of a particular tracked interaction, wherein the selection identifies a particular tracked interaction having a corresponding value to be increased;
generating a modification design, wherein the modification design represents a change to the one or more content elements associated with the network location, wherein the modification design is generated based on the particular tracked interaction, and wherein the modification design is configured to improve the value corresponding to the particular tracked interaction; and
automatically transmitting a representation of the modification design, wherein the representation, when received, automatically changes a content element of the network location according to the modification design, wherein altering the content element increases the value corresponding to the particular tracked interaction.

2. The system of claim 1, wherein the operations further include:
generating an ordering process configured to create an ordered list of interactions that are associated with the selected particular tracked interaction using archived interaction data.

3. The system of claim 2, wherein:
the modification design includes altering the content elements of the network location using the ordered list of interactions.

4. The system of claim 2, wherein the operations further include:
determining an interest of a network device in the one or more content elements of the network location, wherein determining the interest is based on a trend of the archived interaction data.

5. The system of claim 4, wherein the operations further include:
determining a change in activity of the network device, wherein determining the change in activity is based on the trend of the archived interaction data.

6. The system of claim 5, wherein the operations further include:
identifying a group of network devices that periodically connect to the network location that are likely to discontinue the periodic connection to the network location based on the trend of the archived interaction data.

7. The system of claim 1, wherein the operations further include:
determining correlation scores between each of the one or more tracked interactions relative to the remaining one or more tracked interactions, wherein a tracked interaction having a highest correlation score relative to the remaining one or more tracked interactions is selected as the particular tracked interaction.

8. The system of claim 7, wherein the operations further include:
generating a correlation matrix from the correlation scores, wherein the correlation matrix represents a correlation between each tracked interaction relative to the remaining one or more tracked interactions in a single data structure.

9. The system of claim 1, wherein tracking interactions includes:
tracking a duration of a connection of a network device to the network location.

10. The system of claim 9, wherein:
tracking interactions further includes tracking activities of an identified network device connected to the network location, and
storing, in a relational database, information associating the tracked activities with the identified network device.

11. A computer implemented method, comprising:
receiving, on a computing device, one or more log-activity packets containing activity data, wherein the activity data represents one or more interactions with one or more content elements associated with a network location, and wherein an interaction has a corresponding value;
analyzing, by the computing device, the one or more log-activity packets to track one or more interactions with the network location over a period of time;
calculating, by the computing device, one or more values corresponding to the one or more tracked interactions;
receiving, by the computing device, input corresponding to a selection of a particular tracked interaction, wherein the selection identifies a particular tracked interaction having a corresponding value to be increased;
generating, by the computing device, a modification design, wherein the modification design represents a change to the one or more content elements associated with the network location, wherein the modification design is generated based on the particular tracked interaction, and wherein the modification design is configured to improve the value corresponding to the particular tracked interaction; and
automatically transmitting, by the computing device, a representation of the modification design, wherein the representation, when received, automatically changes a content element of the network location according to the modification design, wherein altering the content element increases the value corresponding to the particular tracked interaction.

12. The method of claim 11, further comprising:
generating, by the computing device, an ordering process configured to create an ordered list of interactions that are associated with the selected particular tracked interaction using archived interaction data.

13. The method of claim 12, wherein:
the modification design includes altering the content elements of the network location using the ordered list of interactions.

14. The method of claim 11, wherein:
tracking interactions further includes tracking activities of an identified network device connected to the network location, and
storing, in a relational database, information associating the tracked activities with the identified network device.

15. The method of claim 11, further comprising:
determining an interest of a network device in the one or more content elements of the network location, wherein determining the interest is based on a trend of archived interaction data.

16. A computer-program product tangibly embodied in a non-transitory machine-readable storage medium, and including instructions configured to cause one or more processors to perform operations comprising:
receiving one or more log-activity packets containing activity data, wherein the activity data represents one or more interactions with one or more content elements associated with a network location, and wherein an interaction has a corresponding value;
analyzing the one or more log-activity packets to track one or more interactions with the network location over a period of time;
calculating one or more values corresponding to the one or more tracked interactions;
receiving input corresponding to a selection of a particular tracked interaction, wherein the selection identifies a particular tracked interaction having a corresponding value to be increased;
generating a modification design, wherein the modification design represents a change to the one or more content elements associated with the network location, wherein the modification design is generated based on the particular tracked interaction, and wherein the modification design is configured to improve the value corresponding to the particular tracked interaction; and
automatically transmitting a representation of the modification design, wherein the representation, when received, automatically changes a content element of the network location according to the modification design, wherein altering the content element increases the value corresponding to the particular tracked interaction.

17. The computer-program product of claim 16, wherein the operations further include:
generating an ordering process configured to create an ordered list of interactions that are associated with the selected particular tracked interaction using archived interaction data.

18. The computer-program product of claim 17, wherein:
the modification design includes altering the content elements of the network location using the ordered list of interactions.

19. The computer-program product of claim 16, wherein:
tracking interactions further includes tracking activities of an identified network device connected to the network location, and
storing, in a relational database, information associating the tracked activities with the identified network device.

20. The computer-program product of claim 16, wherein the operations further include: determining an interest of a network device in the one or more content elements of the network location, wherein determining the interest is based on a trend of archived interaction data.

* * * * *